US012662848B2

(12) United States Patent
Boomer et al.

(10) Patent No.: US 12,662,848 B2
(45) Date of Patent: Jun. 23, 2026

(54) INTERCHANGEABLE DECORATIVE TRIM PLATE

(71) Applicant: Schlage Lock Company LLC, Carmel, IN (US)

(72) Inventors: Zachary P. Boomer, Indianapolis, IN (US); Mitchell T. Barbon, Carmel, IN (US)

(73) Assignee: Schlage Lock Company LLC, Carmel, IN (US)

( * ) Notice: Subject to any disclaimer, the term of this patent is extended or adjusted under 35 U.S.C. 154(b) by 808 days.

(21) Appl. No.: 17/189,907

(22) Filed: Mar. 2, 2021

(65) Prior Publication Data

US 2021/0270058 A1 Sep. 2, 2021

Related U.S. Application Data

(60) Provisional application No. 62/983,804, filed on Mar. 2, 2020.

(51) Int. Cl.
*E05B 9/00* (2006.01)
*E05B 15/02* (2006.01)

(52) U.S. Cl.
CPC .................................... *E05B 9/002* (2013.01)

(58) Field of Classification Search
CPC .......... E05B 9/00; E05B 9/002; E05B 1/0084; E05B 1/04; Y10T 292/11; Y10T 292/91; Y10T 70/8568; Y10S 292/11; Y10S 292/53; Y10S 292/54; Y10S 292/63
USPC .................................................... 70/450, 455
See application file for complete search history.

(56) References Cited

U.S. PATENT DOCUMENTS 420,854 A * 2/1890 Atkins .................... E05B 15/02 292/357
924,801 A * 6/1909 Lockwood ............. E05B 15/02 292/357
1,724,630 A * 8/1929 Wilson .................... E05C 1/163 292/169.21
2,114,340 A * 4/1938 Falk ........................ E05B 15/02 70/452
2,131,033 A * 9/1938 Barrington ............ E05B 85/107 292/DIG. 31
2,811,384 A * 10/1957 Schmid ................... E05B 15/02 292/357

(Continued)

FOREIGN PATENT DOCUMENTS

KR 200331143 Y1 * 10/2003
KR 101989562 B1 * 6/2019

*Primary Examiner* — Carlos Lugo
(74) *Attorney, Agent, or Firm* — Taft Stettinius & Hollister LLP

(57) ABSTRACT

An exemplary rose assembly is configured for mounting to a door, and generally includes a cover plate, a mounting plate, and a releasable coupler. The cover plate includes a first opening sized and shaped to receive a spindle of a door hardware apparatus mounted to the door. The mounting plate includes a mounting area, a second opening, and a recessed portion. The mounting area is sized and shaped to receive the cover plate, and the cover plate is mounted to the mounting area. The second opening is sized and shaped to receive the spindle, and is aligned with the first opening. The recessed portion is configured to facilitate removal of the cover plate from the mounting area. The releasable coupler selectively retains the cover plate within the mounting area.

19 Claims, 13 Drawing Sheets

(56) References Cited

U.S. PATENT DOCUMENTS

| | | | | | |
|---|---|---|---|---|---|
| 2,947,507 | A * | 8/1960 | Schlage | E05B 3/003 | 415/10 |
| 3,024,555 | A * | 3/1962 | Abeles | E05B 1/0007 | 74/553 |
| 3,677,593 | A * | 7/1972 | Wahlberg | E05C 1/163 | 292/357 |
| 4,037,865 | A * | 7/1977 | Hook | E05B 3/06 | 292/357 |
| 4,489,577 | A * | 12/1984 | Crepinsek | E05B 15/02 | 403/348 |
| 4,640,112 | A * | 2/1987 | Kambic | E05B 15/02 | 292/357 |
| 4,841,754 | A * | 6/1989 | Jones | E05B 1/0015 | 16/416 |
| 4,858,454 | A * | 8/1989 | McAnulty, III | E05B 17/183 | 220/230 |
| 5,286,074 | A * | 2/1994 | Lin | E05B 13/002 | 292/357 |
| 5,400,628 | A * | 3/1995 | Ryan | E05B 15/1614 | 70/423 |
| 8,360,488 | B2 * | 1/2013 | Forrest | E05B 1/0015 | 292/355 |
| 8,371,141 | B2 | 2/2013 | Richmond | | |
| 9,157,258 | B2 * | 10/2015 | Lawrence | B60R 13/0268 | |
| 10,343,611 | B2 * | 7/2019 | Lawrence | E05B 53/00 | |
| 10,794,082 | B1 | 10/2020 | Watson et al. | | |
| 2004/0078933 | A1 * | 4/2004 | Forrest | E05B 1/0015 | 16/417 |
| 2021/0274669 | A1 * | 9/2021 | Baumgarte | E05B 9/002 | |

* cited by examiner

INTERCHANGEABLE DECORATIVE TRIM PLATE

CROSS-REFERENCE TO RELATED APPLICATIONS

The present application claims the benefit of U.S. Provisional Patent Application No. 62/983,804, filed Mar. 2, 2020, the contents of which are incorporated by reference in their entirety.

TECHNICAL FIELD

The present disclosure generally relates to decorative trims, and more particularly but not exclusively relates to door hardware including decorative trims with interchangeable plates.

BACKGROUND

Door trims typically include a rose and a handle mounted to the rose. In addition to providing structural support for the handle, the rose also typically enhances the overall aesthetic of the trim. In conventional trims, however, should the user desire to change the aesthetic of the rose, the user generally must replace the entire rose, which can be costly and time-consuming. For these reasons among others, there remains a need for further improvements in this technological field.

SUMMARY

An exemplary rose assembly is configured for mounting to a door, and generally includes a cover plate, a mounting plate, and a releasable coupler. The cover plate includes a first opening sized and shaped to receive a spindle of a door hardware apparatus mounted to the door. The mounting plate includes a mounting area, a second opening, and a recessed portion. The mounting area is sized and shaped to receive the cover plate, and the cover plate is mounted to the mounting area. The second opening is sized and shaped to receive the spindle, and is aligned with the first opening. The recessed portion is configured to facilitate removal of the cover plate from the mounting area. The releasable coupler selectively retains the cover plate within the mounting area. Further embodiments, forms, features, and aspects of the present application shall become apparent from the description and figures provided herewith.

DETAILED DESCRIPTION OF ILLUSTRATIVE EMBODIMENTS

Figure 1:
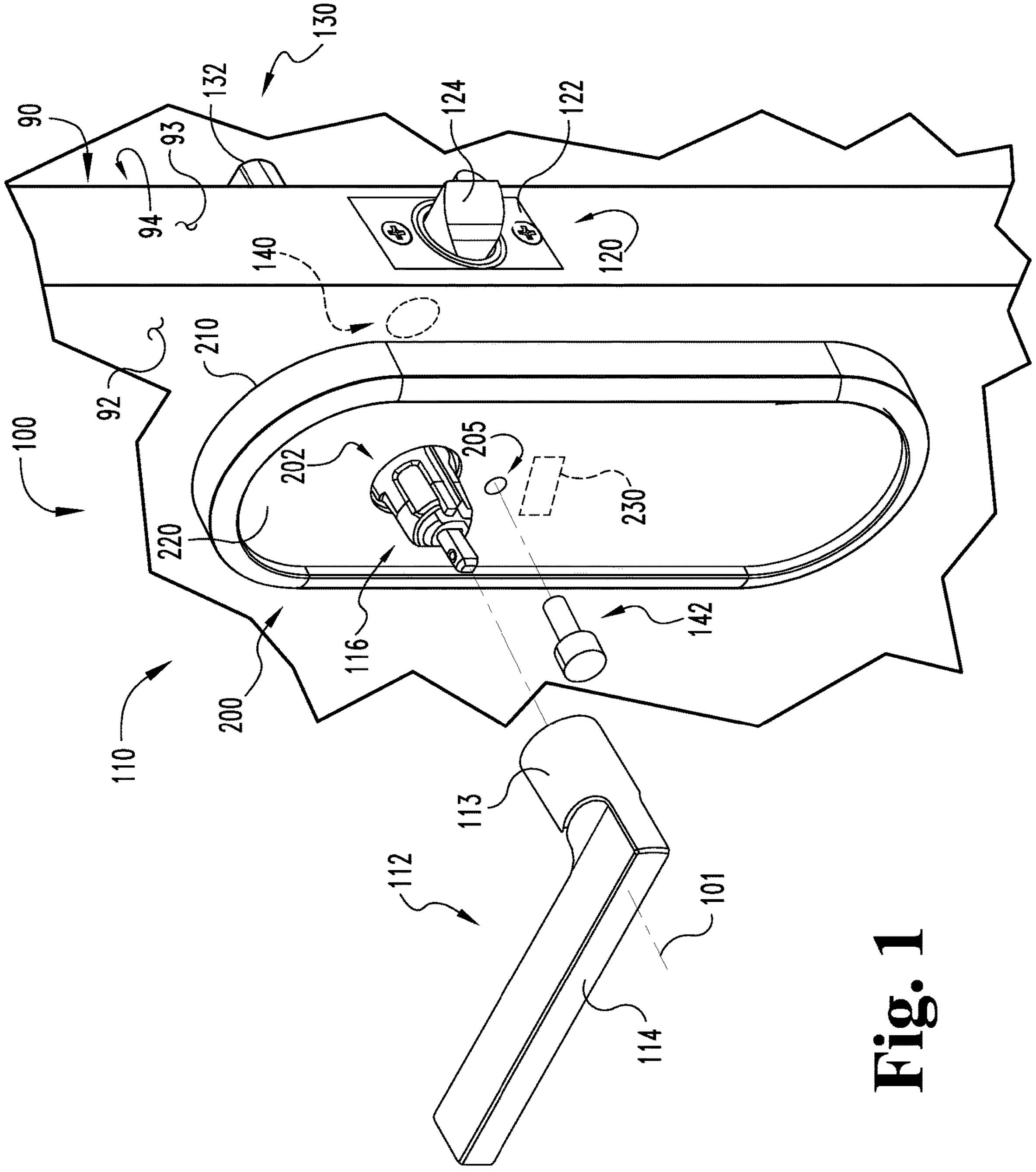
FIG. 1 is a partially exploded assembly view of a door hardware apparatus according to certain embodiments installed to a door.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Items listed in the form of "A, B, and/or C" can also mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

In the drawings, some structural or method features may be shown in certain specific arrangements and/or orderings.

However, it should be appreciated that such specific arrangements and/or orderings may not necessarily be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may be omitted or may be combined with other features.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

With reference to FIG. 1, illustrated therein is a door hardware apparatus 100 according to certain embodiments. The apparatus 100 is mounted to a door 90 including an inner or egress side 92, an outer or non-egress side 94, and a free edge 93 extending between and connecting the two sides 92, 94. The apparatus 100 includes a first trim assembly 110, and may further include a latch mechanism 120 actuated by the trim assembly 110 and/or a second trim assembly 130. In certain embodiments, such as those that include both the latch mechanism 120 and the second trim assembly 130, the apparatus 100 may further include a lock mechanism 140 operable to selectively prevent the second trim assembly 130 from operating the latch mechanism 120. As described herein, the door hardware apparatus 100 may further include one or more electronic components.

The first trim assembly 110 generally includes a rose assembly 200 and a handle 112 mounted to the rose assembly 200 via a spindle 116 that extends along a primary axis 101, which extends along and defines a proximal direction and an opposite distal direction. In the illustrated form, the handle 112 is provided as a lever handle, and generally includes a shank 113 extending along the primary axis 101 and a grip portion 114 extending laterally from the shank 113. It is also contemplated that the handle 112 may be provided in another form, such as that of a knob handle. In the illustrated form, the spindle 116 extends through an opening 202 of the rose assembly 200 and is rotatably mounted to the rose assembly 200 such that the primary axis 101 is a rotational axis of the handle 112. It is also contemplated that that the spindle 116 may have a fixed orientation, for example in embodiments in which the first trim assembly 110 is provided as a dummy trim.

In the illustrated form, the first trim assembly 110 is mounted to the egress side 92, and may alternatively be referred to as the interior trim assembly 110. It is also contemplated that a trim assembly including the rose assembly 200 may be mounted to the non-egress side 94 of the door 90, for example as described with reference to the second trim assembly 130.

In certain embodiments, the apparatus 100 may include a latch mechanism 120. In such forms, the latch mechanism 120 may include a housing 122 and a latchbolt 124 movably mounted to the housing 122. The latch mechanism 120 may be operably connected with the spindle 116 such that rotation of the spindle 116 causes retraction of the latchbolt 124. While the illustrated apparatus 100 includes the latch mechanism 120, it is also contemplated that the latch mechanism 120 may be omitted. For example, the trim assembly 110 may be provided as a dummy trim that is not connected to a latch mechanism. As another example, the latch mechanism 120 may be replaced by a roller latch.

In certain embodiments, the apparatus 100 may include a second trim assembly 130. The second trim assembly 130 may be mounted to the non-egress side 94 of the door 90, and may alternatively be referred to as the outside trim assembly 130. The second trim assembly 130 may include a second handle 132, which may be mounted to a second rose assembly via a second spindle. The second rose assembly may be similar to the rose assembly 200 described herein. It is also contemplated that the second rose assembly may be of another form. In certain embodiments, the second handle 132 may be at least selectively operable to actuate the latch mechanism 120. In certain forms, the apparatus 100 may have a passage function in which the second handle 132 is always operable to actuate the latch mechanism 120. Additionally or alternatively, the apparatus 100 may have a privacy function in which the second handle 132 is selectively prevented from actuating the latch mechanism 120, for example by the lock mechanism 140.

In certain embodiments, such as those that include both the latch mechanism 120 and the second trim assembly 130, the apparatus 100 may further include a lock mechanism 140 operable to selectively prevent the outside handle 132 from actuating the latch mechanism 120. In certain embodiments, the lock mechanism 140 may include an actuator 142 accessible from the inner side 92 of the door 90. For example, the actuator 142 may project through a second opening 205 in the rose assembly 200. The actuator 142 may be movable between a first locking position and a second unlocking position to transition the lock mechanism 140 between a locking state and an unlocking state. In the locking state, the lock mechanism 140 prevents the outside handle 132 from actuating the latch mechanism 120. In the unlocking state, the outside handle 132 is operable to actuate the latch mechanism 120. While other forms are contemplated, in the illustrated embodiment, the locking position is a depressed position, and the unlocking position is a projected position. Additionally, while the actuator 142 of the illustrated embodiment projects through the rose assembly 200, it is also contemplated that the actuator 142 may be mounted elsewhere, such as on the interior handle 112. Lock mechanisms that selectively prevent actuation of an outside handle are well known in the art, and need not be described in further detail herein.

In the illustrated embodiment, the door hardware apparatus 100 is provided in the form of a lockset, and includes an inside trim assembly 110, a latch mechanism 120, an outside trim assembly 130, and a locking mechanism 140, wherein each of the trim assemblies 110, 130 is at least selectively operable to actuate the latch mechanism 120. The lockset may, for example, be provided as a tubular lockset, a cylindrical lockset, a mortise lockset, or another form of lockset. It is also contemplated that one or more of the features described herein may be omitted. For example, the latch mechanism 120 may be omitted or replaced by a roller latch, and the trim assemblies 110, 130 may be provided as dummy trims in which the handle 112 has a fixed orientation. In certain embodiments, the door hardware apparatus 100 may instead be provided as an exit device assembly in which the inside trim assembly 110 is replaced by a pushbar exit device such that the outside trim assembly 130 is at least selectively operable to actuate the pushbar exit device.

Figure 2:
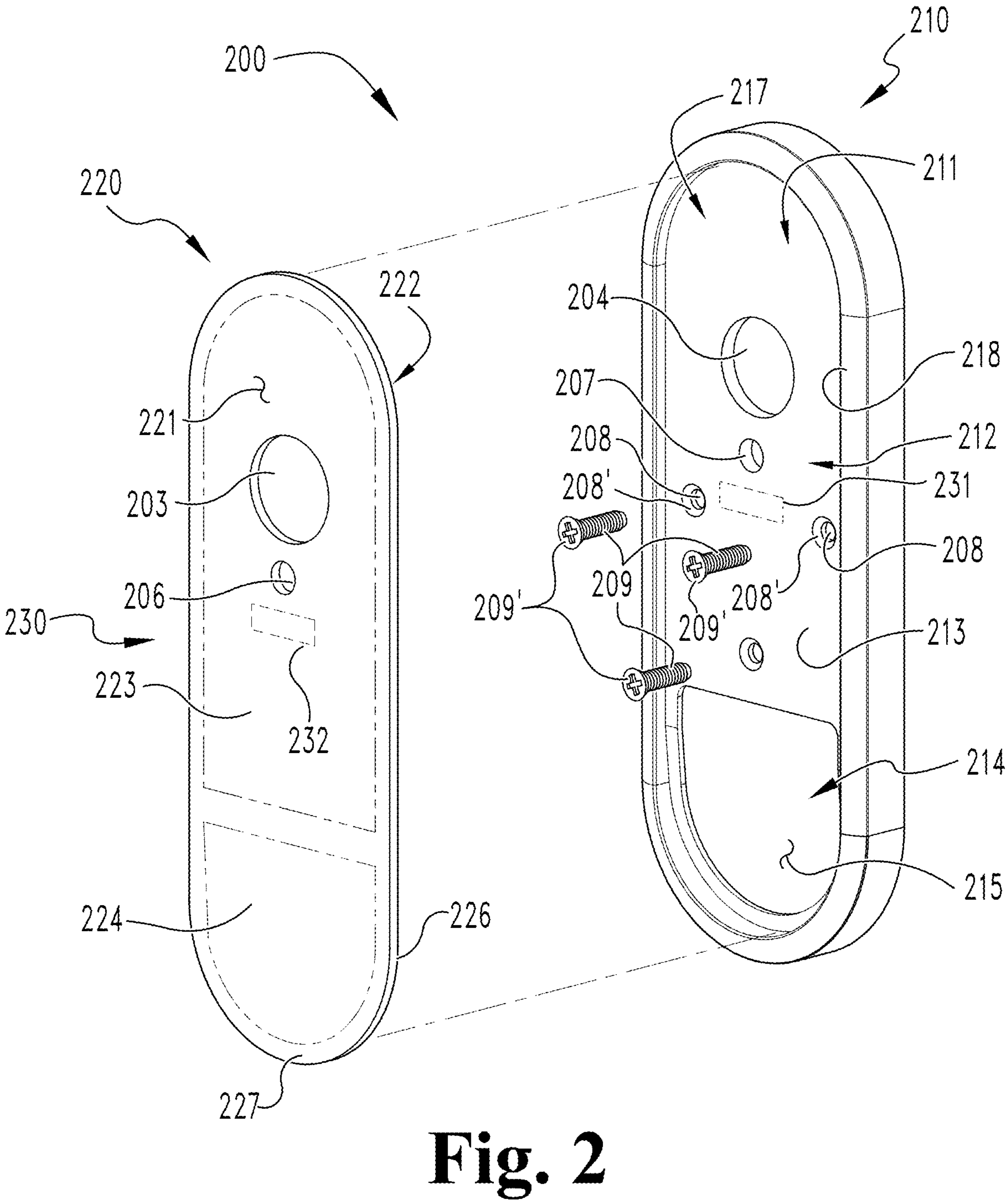
FIG. 2 is an exploded assembly view of a rose assembly according to certain embodiments.

With additional reference to FIG. 2, the rose assembly 200 generally includes a mounting plate 210 configured for mounting to the door 90, a cover plate 220 configured for mounting to the mounting plate 210, and a releasable coupler 230 releasably coupling the cover plate 220 to the mounting plate 210. As described herein, the cover plate 220 can be easily reoriented and/or replaced to change the overall aesthetic of the rose assembly 200.

As noted above, the illustrated rose assembly 200 includes a first opening 202 and a second opening 205. The first opening 202 is defined in part by a first aperture 203 formed in the cover plate 220 and a second aperture 204 formed in the mounting plate 210. When the cover plate 220 is mounted to the mounting plate 210, the apertures 203, 204 are aligned such that the spindle 116 can extend through the spindle opening 202. Similarly, the second opening 205 is defined in part by a first aperture 206 formed in the cover plate 220 and a second aperture 207 formed in the mounting plate 210. When the cover plate 220 is mounted to the mounting plate 210, the apertures 206, 207 are aligned such that the actuator 142 can extend through the actuator opening 205 for connection with the internal components of the lock mechanism 140. The mounting plate 210 may further include one or more fastener apertures 208 for receiving fasteners 209 by which the mounting plate 210 may be coupled to the door 90. The fastener apertures 208 may, for example, extend through support posts 219 (FIGS. 4 and 5) of the mounting plate 210 to engage the door 90. In the illustrated form, the fastener apertures 208 are countersunk. Stated another way, each fastener aperture 208 includes a corresponding countersink 208' operable to receive a head 209' of a corresponding fastener 209.

The mounting plate 210 generally includes a mounting area 211 sized and shaped to receive the cover plate 220, and may further include a raised perimeter or lip 218 surrounding the mounting area 211. In the illustrated form, the mounting area 211 is provided as a receiving space 217 that is defined at least in part by the lip 218. In other embodiments, a mounting area may not necessarily define a receiving space. As described herein, the lip 218 is one form of an alignment mechanism that aids in aligning the cover plate aperture(s) 203, 206 with the mounting plate aperture(s) 204, 207 to define the spindle opening 202 and the actuator opening 205. It is also contemplated that an alignment mechanism may take another form, such as that described below with reference to FIGS. 13-17.

Figure 3:
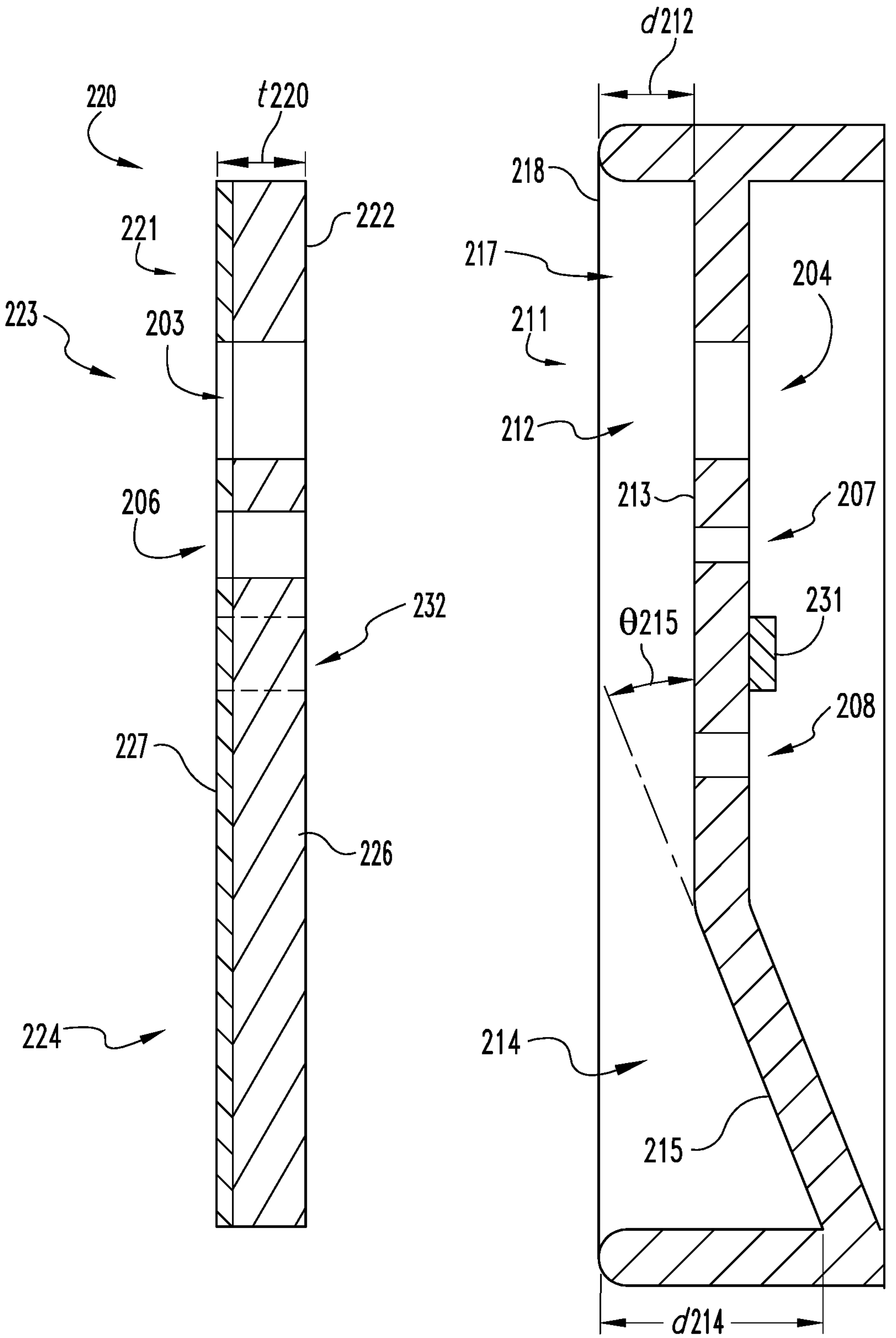
FIG. 3 is a cross-sectional illustration of the rose assembly illustrated in FIG. 2 while in a disassembled state.

With additional reference to FIG. 3, the illustrated mounting area 211 includes a primary receiving space 212 and a recessed portion 214. The primary receiving space 212 is defined in part by a first planar surface 213 that faces a rear side of the cover plate 220 when the cover plate 220 is mounted to the mounting area 211. In the illustrated form, the recessed portion 214 is defined by a second planar surface 215 that extends at an oblique angle θ215 relative to the first planar surface 213. More particularly, the second planar surface 215 extends at the oblique angle θ215 in a distal or rearward direction that extends away from the cover plate 220 when the cover plate 220 is seated in the mounting area 211. While the second surface 215 defining the illustrated recessed portion 214 is planar, it is also contemplated that the second surface 215 may be provided as a curved surface (e.g., a convex surface or a concave surface) that curves distally away from the first surface 213.

The primary receiving space 212 has a first depth d212, and the recessed portion 214 has a second depth d214. The first depth d212 is measured from the first planar surface 213 to the proximal face of the lip 218, and the second depth d214 is measured from the second planar surface 215 to the proximal face of the lip 218. The second surface 215 extends distally away from the first surface 213, and as a result, the second depth d214 is greater than the first depth d212. In certain embodiments, the first depth d212 may correspond to the thickness t220 of the cover plate 220 such that the outward-facing surface 221 of the cover plate 220 is substantially flush with the lip 218 when the cover plate 220 is seated in the receiving space 217. For example, the first depth d212 and the cover plate thickness t220 may be within 5 millimeters (mm) of one another. It is also contemplated that the outward-facing surface 221 and the lip 218 may not necessarily be substantially flush with one another.

The cover plate 220 is sized and shaped to be seated in the mounting area 211. For example, the outer perimeter of the cover plate 220 may generally conform to the inner perimeter of the lip 218 such that the lip 218 is operable to circumferentially surround the cover plate 220. The cover plate 220 includes a first side or first surface 221 and an opposite second side or second surface 222. When the cover plate 220 is seated in the mounting area 211 in the illustrated orientation, the first surface 221 is an outward- or proximal-facing front surface, and the second surface 222 is an inward- or distal-facing rear surface. The cover plate 220 also includes a first region 223 and a second region 224. In the illustrated form, the first region 223 is larger than the second region. When the cover plate 220 is seated in the mounting area 211, the first region 223 is seated in the primary receiving space 212 and is aligned with the first surface 213, and the second region 224 is received in or adjacent to the recessed portion 214. In the illustrated form, the first region 223 includes the apertures 203, 206, and is positioned above the second region 224. It is also contemplated that the first region 223 may be positioned below the second region 224. In the illustrated form, the cover plate 220 includes a support substrate 226 and a decorative finish 227 that defines the first surface 221.

In certain embodiments, the cover plate 220 may be reversible such that each of the first surface 221 and the second surface 222 is capable of being each of the proximal-facing front surface and the distal-facing rear surface. In such forms, the first surface 221 may have a first appearance, and the second surface 222 may have a second appearance different from the first appearance in at least one ornamental aspect (e.g., design, color, finish, texture, material, indicia, background, foreground, image, and/or pattern). As one example, the first surface 221 may include a first design, a first color, a first finish, a first indicium, and/or a first pattern, and the second surface 222 may include a second design, a second color, a second finish, a second indicium, and/or a second pattern. It should be appreciated that the first surface 221 and the second surface 222 may be substantially similar in at least one aspect. For example, the first surface 221 may include first indicia on a first background, and the second surface 222 may include second indicia on the same first background.

As described herein, the aesthetic appearance of the rose assembly 200 may be customized by replacing the cover plate 220 with another cover plate 220. In embodiments in which the cover plate 220 is reversible, the aesthetic appearance of the rose assembly 200 may be customized not only by replacing the cover plate 220 with a second cover plate 220, but also by simply reversing the orientation of the cover plate 220. More particularly, the appearance of the rose assembly 200 can be altered by reversing the orientation of the cover plate 220 from a first orientation in which the first surface 221 is the outward- or proximal-facing front surface and the second surface 222 faces the mounting plate first surface 213, to a second orientation in which the second surface 222 is the outward- or proximal-facing front surface and the first surface 221 faces the mounting plate first surface 213.

The releasable coupler 230 selectively retains the cover plate 220 in engagement with the mounting area 211, and generally includes a first coupling portion 231 and a second coupling portion 232 configured to releasably couple with the first coupling portion 231. The mounting plate 210 includes the first coupling portion 231, which may alternatively be referred to as the mounting plate coupling portion 231. The cover plate 220 includes the second coupling portion 232, which may alternatively be referred to as the cover plate coupling portion 232.

In the illustrated form, the releasable coupler 230 is provided as a magnetic coupler that includes at least one magnet. In certain embodiments, the first coupling portion 231 comprises a magnet, and the second coupling portion 232 comprises a ferrous material. For example, the cover plate 220 may be formed of steel or another ferrous material, and the second coupling portion 232 may be defined by the material of the plate 220. As another example, the cover plate 220 may be formed of wood, plastic, or another non-ferrous material, and may have mounted thereon or embedded therein a strip of ferrous material and/or a magnet. Additionally or alternatively, the second coupling portion 232 may comprise a magnet. In certain forms, both coupling portions 231, 232 may comprise magnets. As will be appreciated, such magnets may be oriented such that the magnetic forces developed between the magnets attract the coupling portions 231, 232 to one another.

While the illustrated releasable coupler 230 comprises at least one magnet, it is also contemplated that other releasable couplers may be used. For example, the releasable coupler 230 may include an adhesive, mating snap features, a hook-loop fastener, a hook-hook fastener, or other forms of releasable fastener that can be disengaged without requiring the use of a tool. It is also contemplated that a releasable fastener may be a tool-assisted releasable fastener, such as a screw, a bolt, or another threaded fastener.

Figure 4:
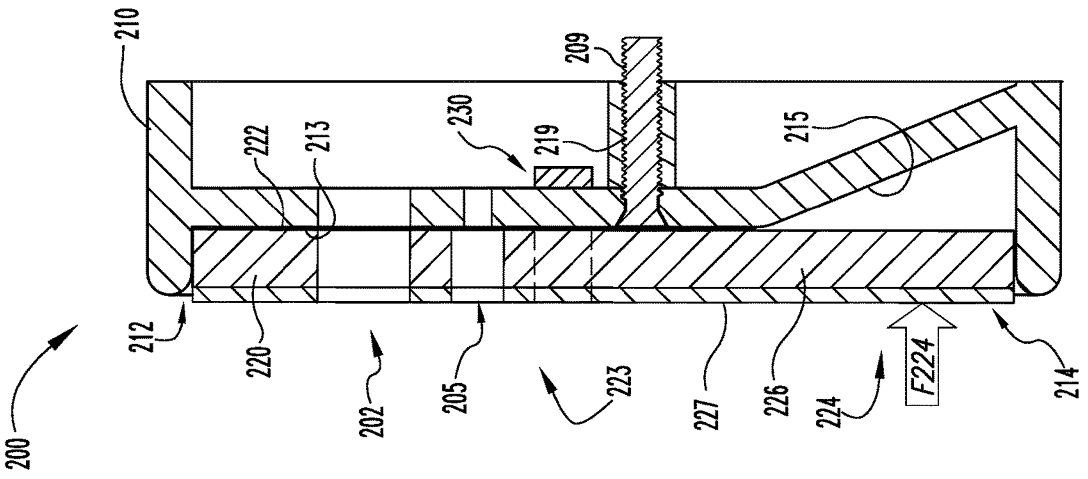
FIG. 4 is a cross-sectional illustration of the rose assembly illustrated in FIG. 2 while in an assembled state.
Figure 18:
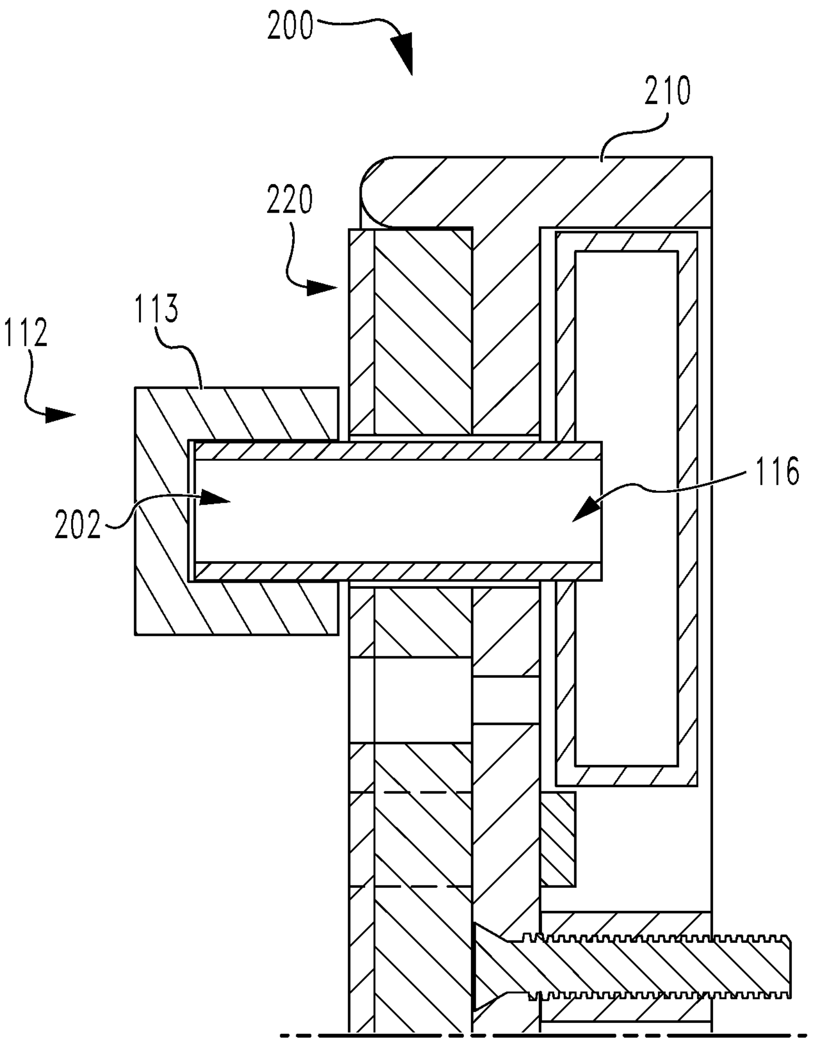
FIG. 18 is a cross-sectional view of a portion of the rose assembly illustrated in FIGS. 2-5, with a handle installed to a spindle in order to prevent removal of a cover plate.

With additional reference to FIG. 4, when the cover plate 220 is installed to the mounting plate 210, the first region 223 is seated in the primary receiving space 212 such that the rear surface 222 of the first region 223 faces the first surface 213. Additionally, the second region 224 is adjacent to and/or aligned with the recessed portion 214 such that the rear surface 222 of the second region 224 faces and is spaced apart from the second surface 215. The cover plate 220 is releasably retained in this seated position by the releasable coupler 230. When the handle 112 is installed to the spindle 116, the distal end of the shank 113 may abut or be in close proximity to the front surface 221 of the cover plate 220 to discourage or prevent removal of the cover plate 220 from the mounting area 211, for example as illustrated schematically in FIG. 18.

Figure 5:
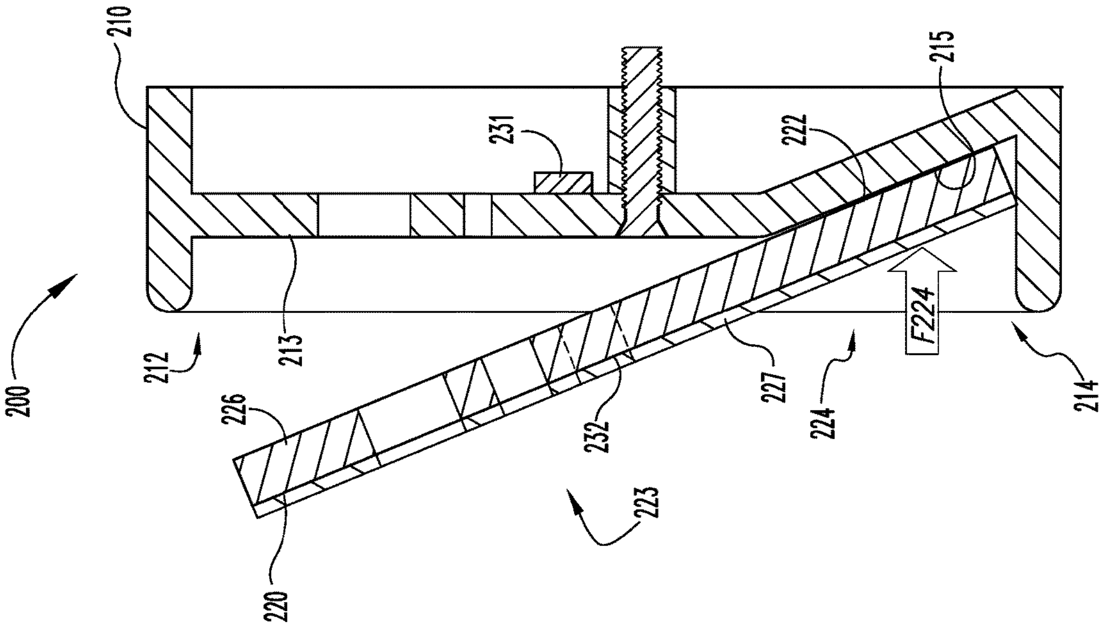
FIG. 5 is a cross-sectional illustration of the rose assembly illustrated in FIG. 2 while in a partially disassembled state.

With additional reference to FIG. 5, when a pushing force F224 is applied to the second region 224, the second region 224 enters the recessed portion 214. This causes the first region 223 to pivot out of the primary receiving space 212, thereby exposing the top edge of the cover plate 220 for grasping by the user. In the illustrated form, this pivoting causes the coupling portions 231, 232 to release from engagement with one another. In other embodiments, such as those in which the releasable coupler comprises a tool-assisted fastener, the coupling portions 231, 232 may need to be released from engagement with one another prior to exerting the pushing force F224.

In the illustrated form, the recessed portion 214 is substantially entirely covered by the cover plate 220 when the cover plate 220 is installed to the mounting plate 210. It is also contemplated that a recessed portion may be formed elsewhere on the mounting plate 210. For example, a recessed portion may be formed at least partially in the lip 218 to aid a user in positioning their fingers behind the cover plate 220. In such forms, the user may exert a pulling force to remove the cover plate 220 from the mounting plate 210.

During installation of the cover plate 220 to the mounting plate 210, an alignment mechanism including the lip 218 facilitates the positioning of the cover plate 220 in the appropriate location and orientation relative to the mounting area 211. More particularly, the inner geometry of the lip 218 and the outer geometry of the cover plate 220 correspond to one another such that when the lip 218 surrounds the outer geometry of the cover plate 220, the aperture 203 of the cover plate 220 is aligned with the aperture 204 of the mounting plate 210 such that the spindle 116 can extend through the aligned apertures 203, 204. Similarly, the actuator-receiving aperture 206 is aligned with the corresponding aperture 207 formed in the mounting plate 210 such that the lock actuator 142 can extend through the aligned apertures 206, 207 for connection with the internal components of the lock mechanism 140.

Upon installation of the cover plate 220 to the mounting plate 210, the alignment mechanism including the lip 218 also aids in retaining the cover plate 220 in the proper location and orientation relative to the mounting area 211. More particularly, when the cover plate 220 is seated in the receiving space 212, the lip 218 is operable to engage the outer perimeter of the cover plate 220 to limit movement of the cover plate 220 in directions transverse to the primary axis 101. When the handle 112 is installed, the shank 113 of the handle 112 may face the cover plate 220 and limit movement of the cover plate 220 in the proximal direction along the primary axis 101.

Figure 6:
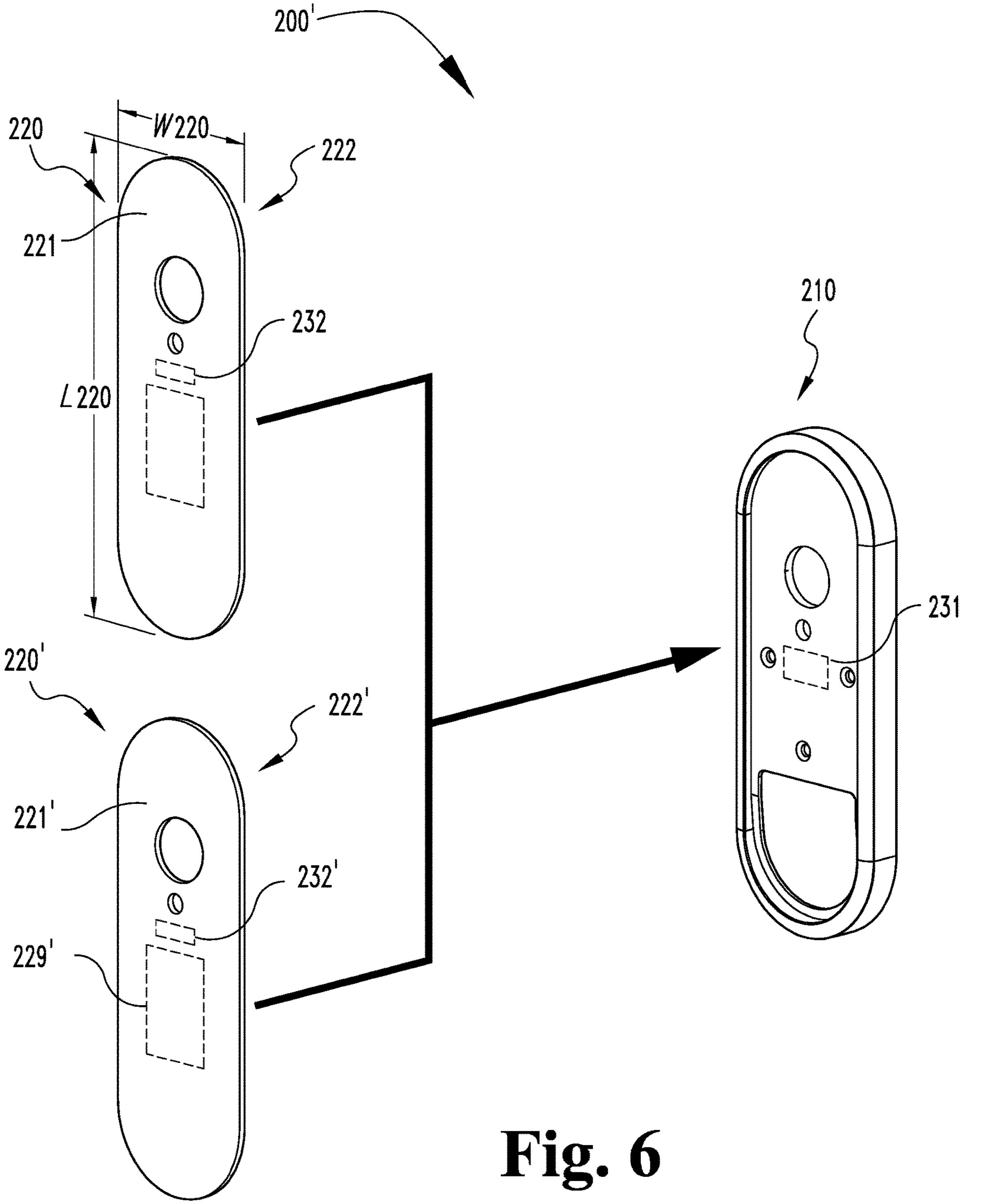
FIG. 6 illustrates a system that may be utilized to create the rose assembly illustrated in FIGS. 2-5.

With additional reference to FIG. 6, illustrated therein is a rose assembly system or product line 200' according to certain embodiments, which may be utilized to create a rose assembly 200 along the lines set forth above. The rose assembly product line 200' includes the mounting plate 210, a first cover plate 220, and the releasable coupler 230. As noted above, the first surface 221 of the first cover plate 220 has a first aesthetic appearance, which in the illustrated form comprises one or more first ornamental aspects 229. Each ornamental aspect 229 may, for example, comprise one or more of a design, a color, a finish, a texture, a material, one or more indicia, a background, a foreground, an image, and/or a pattern. In the interest of conciseness, the following description of the rose assembly product line 200' focuses primarily on elements and features that were not specifically described above with reference to the rose assembly 200.

In addition to the first cover plate 220, the illustrated product line 200' may further include a second cover plate 220' that is interchangeable with the first cover plate 220. The second cover plate 220' includes a second cover plate first surface 221' that includes one or more second ornamental aspects 229'. At least one of the second ornamental aspects 229' differs from at least one of the first ornamental aspects 229. For example, the first cover plate first surface 221 may have a first finish, and the second cover plate first surface 221' may have a second finish different from the first finish. Additionally or alternatively, the first cover plate 220 may be formed of a first material, and the second cover plate 220' may be formed of a second material different from the first material.

Each cover plate 220 in the product line 200' has a longitudinal length L220, a lateral width w220 less than the length L220, and a transverse thickness t220 (FIG. 3) less than the width w220. Each cover plate 220 also has an outer geometry or outer perimeter that defines the length L220 and the width w220. The outer geometries of the cover plates 220 match one another, and correspond to the geometry of the mounting area 211. In the illustrated form, the outer geometries of the cover plates 220 are provided in the form of a racetrack including two parallel edges and two curved or arcuate edges, wherein the parallel edges extend between and connect opposite ends of the curved or arcuate edges. It is also contemplated that the outer geometries of the cover plates 220 may take another form, such as that of a rectangle with curved corners, or other geometries.

Each cover plate 220, 220' includes a cover plate coupler 232, 232' configured to releasably engage the mounting plate coupler 231. In certain embodiments, the first cover plate coupler 232 may be substantially similar to the second cover plate coupler 232'. It is also contemplated that the first and second cover plate couplers 232, 232' may be different from one another. As one example, in embodiments in which the mounting plate coupler 231 comprises a magnet, the first cover plate 220 may be formed of a ferrous material, and the first cover plate coupler 232 may be defined by such ferrous material. Should the second cover plate 220' be formed of a non-ferrous material, the second cover plate coupler 232' may be provided as a magnet or a strip of ferrous material, either of which may be attached to and/or embedded in the second cover plate 220'.

Figure 7:
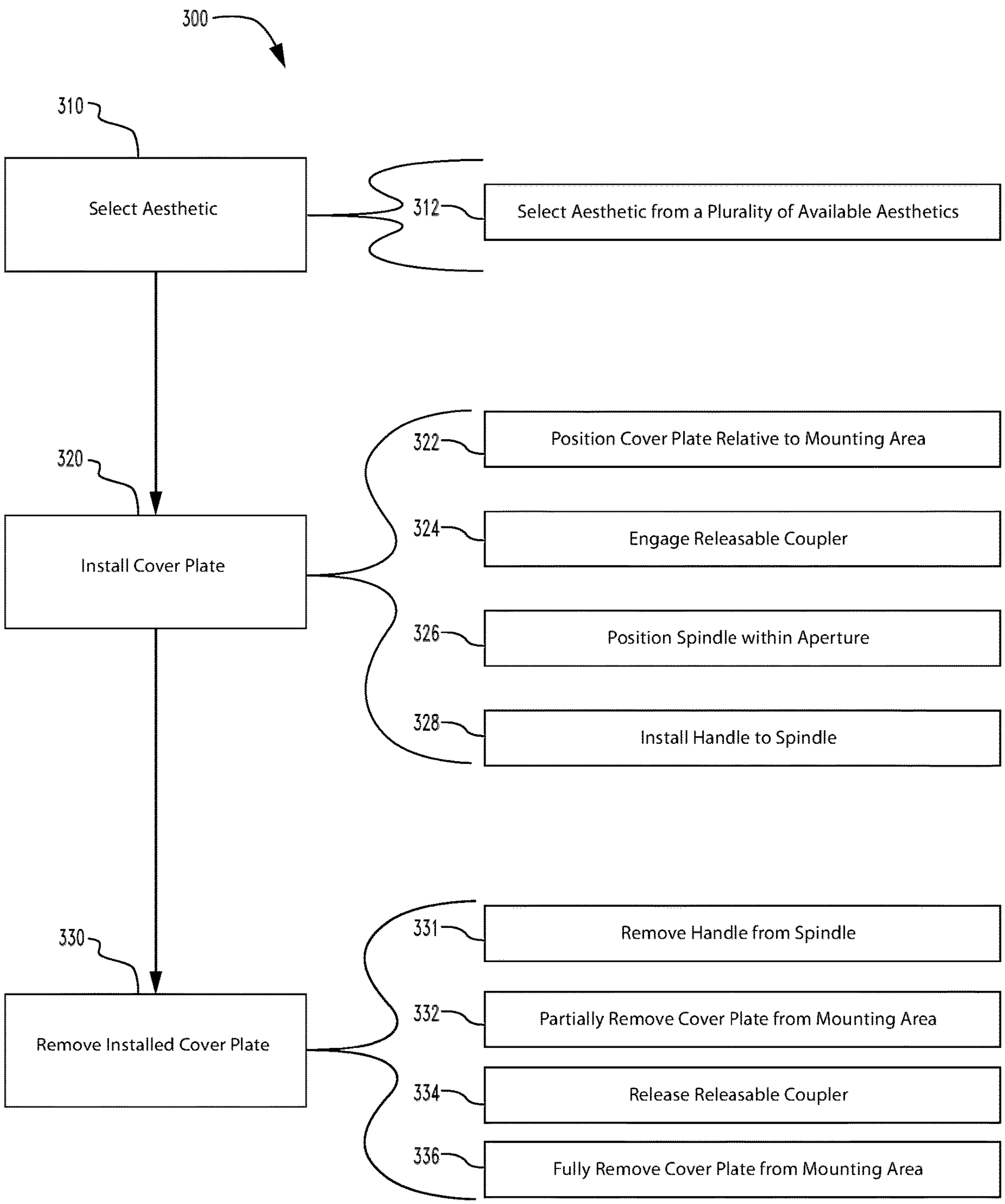
FIG. 7 is a schematic block diagram of a process according to certain embodiments.

With additional reference to FIG. 7, illustrated therein is a process 300 according to certain embodiments, which may be utilized to customize the aesthetic appearance of a rose assembly. Blocks illustrated for the processes in the present application are understood to be examples only, and blocks may be combined or divided, and added or removed, as well as re-ordered in whole or in part, unless explicitly stated to the contrary. While the blocks are illustrated in a relatively serial fashion, it is to be understood that two or more of the blocks may be performed concurrently or in parallel with one another. Additionally, while the process 300 is described herein with specific reference to the rose assembly 200 and corresponding product line 200' illustrated in FIGS. 1-6, it is to be appreciated that the process 300 and variations thereof may be performed using rose assemblies and/or systems having additional or alternative features.

The illustrated process 300 generally involves a selection procedure 310, an installation procedure 320, and a removal procedure 330. As described herein, the selection procedure 310 generally involves selecting an aesthetic for the rose assembly 200, the installation procedure 320 generally involves installing a cover plate 220 to provide the rose assembly 200 with the selected aesthetic, and the removal procedure 330 generally involves removing an installed cover plate 220 from the rose assembly 200.

In certain embodiments, the process 300 may include a selection procedure 310, which generally involves selecting an aesthetic for a rose assembly 200. In the illustrated form, the selection procedure 310 includes block 312, which generally involves selecting a first aesthetic from a plurality of available aesthetics. The plurality of available aesthetics includes the first aesthetic and at least one additional aesthetic. Each aesthetic corresponds to a respective face of a cover plate, and the first aesthetic corresponds to the first surface 221 of the first cover plate 220. In certain embodiments, such as those in which the cover plate 220 is reversible, one of the additional aesthetics may correspond to the second surface 222 of the cover plate 220. In certain embodiments, such as those in which the process 300 is performed using a product line 200' including a second cover plate 220', one of the additional aesthetics may correspond to the first surface 221' of the second cover plate 220'.

The process 300 may include an installation procedure 320, which generally involves releasably mounting a cover plate to the mounting plate 210 in a first orientation. The first orientation is one in which the surface that provides the first aesthetic faces outward and is visible to users of the rose assembly 200. For example, in a first iteration of the process 300, the installation procedure 320 may involve mounting the first cover plate 220 to the mounting plate 210 in an orientation in which the first surface 221 faces outward and the second surface 222 faces the first mounting plate surface 213.

The installation procedure 320 includes block 322, which generally includes positioning the cover plate 220 at the mounting area 211 such that the second surface 222 of the cover plate 220 faces the first surface 213 of the mounting plate 210. With the second surface 222 facing the mounting plate 210, the first surface 221 faces outward such that the first surface 221 and the selected aesthetic are visible to users.

The installation procedure 320 may include block 324, which generally involves engaging the first cover plate coupler 232 with the mounting plate coupler 231, thereby releasably securing the first cover plate 220 to the mounting area 211. In the illustrated form, block 324 includes placing the ferrous material defining the first cover plate coupler 232 in proximity of the magnet defining the mounting plate coupler 231 such that magnetic attraction draws the couplers 231, 232 together. As should be appreciated, block 324 may be performed with the cover plate 220 in the selected orientation such that the releasable coupler 230 maintains the cover plate 220 in the selected orientation, in which the first surface 221 provides the rose assembly 200 with the selected aesthetic.

In certain embodiments, such as those in which the cover plate 220 includes a spindle-receiving aperture 203, the installation procedure 320 may include block 326, which generally involves positioning the spindle 116 within the aperture 203. Block 326 may, for example, be performed after placing the cover plate 220 in the appropriate orientation.

In certain embodiments, the installation procedure 320 may begin with the handle 112 removed to facilitate installation of the cover plate 220. As described herein, the handle 112 may, for example, have been removed in a prior iteration of the removal procedure 330. In certain embodiments, such as those in which the handle 112 was previously removed, the installation procedure 320 may further include block 328, which generally involves attaching the handle 112 to the spindle 116. With the handle 112 installed, the distal end of the shank 113 may be positioned adjacent the outward-facing first surface 221 to discourage or prevent removal of the cover plate 220.

The process 300 may include a removal procedure 330, which generally involves removing an installed cover plate from the mounting plate 210. For example, in a first iteration of the process 300, the removal procedure 330 may involve removing the first cover plate 220 from the mounting plate 210. In certain forms, such as those in which the handle 112 is installed and discourages or prevents removal of the cover plate 220, the removal procedure 330 may begin with block 331, which generally involves removing the handle 112 from the spindle 116, thereby freeing the installed cover plate 220 for removal.

In the illustrated form, the removal procedure 330 includes block 332, which generally involves utilizing the recessed portion 214 to partially remove the cover plate 220 from the mounting area 211. More particularly, the illustrated embodiment of block 332 involves exerting a pushing force F224 on the second region 224 of the installed cover plate 220. As illustrated in FIGS. 4 and 5, this pushing force F224 urges the second region 224 into the recessed portion 214, thereby pivoting the cover plate 220 from the installed position (FIG. 4) to a partially-removed position (FIG. 5). In the partially-removed position, the rear surface 222 of the second region 224 abuts the second surface 215 of the mounting plate 210 such that the first region 223 defines the oblique angle θ215 relative to the first surface 213 of the mounting plate 210. Moreover, the first region 223 at least partially exits the mounting area 211, thereby exposing the top edge of the cover plate 220 for grasping by a user.

In the illustrated embodiment, block 332 involves exerting a pushing force F224 to pivot the cover plate 220 to the partially-removed position illustrated in FIG. 5. In other embodiments, block 332 may involve exerting a force of another type to aid in removing the cover plate 220. For example, in embodiments in which the recessed portion 214 extends through the lip 218, block 332 may involve inserting a finger or tool through a groove in the lip 218 and exerting a pulling force to at least partially remove the cover plate 220 from the mounting area 211.

The illustrated removal procedure 330 also includes block 334, which generally involves releasing the releasable coupler 230. More particularly, block 334 involves decoupling the mounting plate coupler 231 from the first cover plate coupler 232. As noted above, the illustrated releasable coupler 230 is provided as a tool-less coupler that is able to be decoupled without the use of tools. More particularly, the releasing of block 334 is performed contemporaneously with and automatically as a result of the pivoting of the cover plate 220 in block 332. It is also contemplated that the decoupling of block 334 may be performed independently of and/or prior to the pivoting in block 332. For example, in embodiments in which the releasable coupler 230 comprises a tool-assisted coupler (e.g., a threaded fastener), block 334 may involve releasing the coupler 230 using the appropriate tool prior to exerting the pushing force F224 in block 332.

The removal procedure 330 further includes block 336, which generally involves fully removing the cover plate 220 from the mounting area 211. Block 336 may, for example, involve gripping the exposed upper portion of the cover plate 220 and pulling the cover plate proximally out of the receiving space 217.

As should be appreciated, one or more blocks of the process 300 may be repeated or iterated to replace the first aesthetic with a second aesthetic. For example, in embodiments in which the cover plate 220 is reversible, one or more blocks of the process 300 may be iterated to reverse the orientation of the cover plate 220. As another example, in embodiments in which a second cover plate 220' is provided, one or more blocks of the process 300 may be iterated to install the second cover plate 220'. Each of these examples will now be briefly discussed.

In certain embodiments, such as those in which the cover plate 220 is reversible, the process 300 may be iterated to reverse the orientation of the cover plate 220. For example, the selection procedure 310 may involve selecting the aesthetic provided by the second surface 222 of the cover plate 220. In such forms, the installation procedure 320 may be performed to install the cover plate 220 to the mounting area 211 in a second orientation opposite the first orientation. As noted above, the first selected orientation is one in which the first surface 221 faces outward and provides the rose assembly 200 with the selected aesthetic, while the second surface 222 faces the first surface 213 of the mounting plate 210 and is obscured from view. Thus, the reversed or second orientation is one in which the second surface 222 faces outward and provides the rose assembly 200 with the selected aesthetic, while the first surface 221 faces the first surface 213 of the mounting plate 210 and is obscured from view. The cover plate 220 may be reoriented from the first orientation to the second orientation by rotating the cover plate 220 by one half rotation (i.e., 180°) about its longitudinal axis (i.e., the axis extending in the length direction). Should the user again desire to change the aesthetic, the removal procedure 330 may be performed to remove the cover plate 220, and the procedures 310, 320 may be reiterated to select a new aesthetic and install a corresponding cover plate.

In certain embodiments, such as those in which a second cover plate 220' is provided or available to the user, one or more blocks of the process 300 may be iterated to select and install the second cover plate 220'. For example, the selection procedure 310 may involve selecting the aesthetic provided by the first surface 221' of the second cover plate 220. In such forms, the installation procedure 320 may be performed to install the second cover plate 220' to the mounting area 211 in an orientation in which the first surface 221' is exposed and provides the rose assembly 200 with the selected aesthetic. Should the user again desire to change the aesthetic, the removal procedure 330 may be performed to remove the second cover plate 220', and the procedures 310, 320 may be reiterated to select a new aesthetic and install a corresponding cover plate.

As should be appreciated from the foregoing, the systems and methods described herein may provide one or more advantages over the existing art. For example, the systems and methods described herein may facilitate the customization of a rose assembly and/or a door hardware apparatus including such a rose assembly. In certain embodiments, the systems and methods described herein may provide for such customization without the use of tools, thereby further facilitating the customization process.

Figure 8:
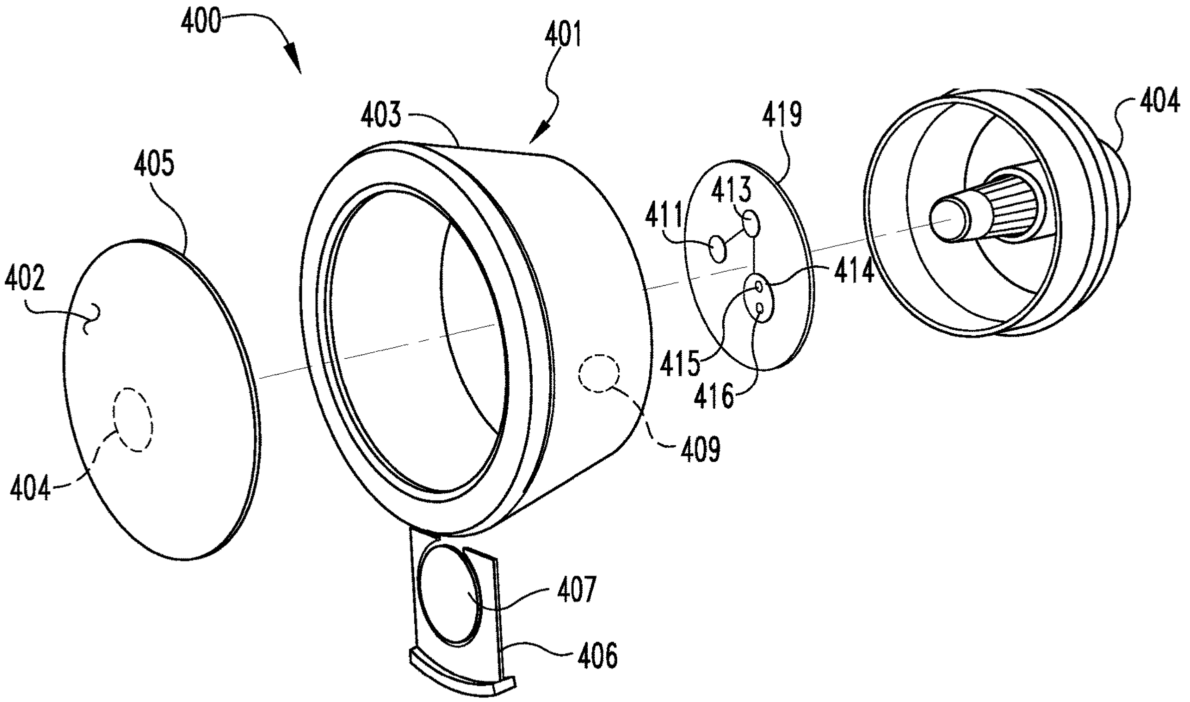
FIG. 8 is an exploded assembly view of a door knob according to certain embodiments.
Figure 9:
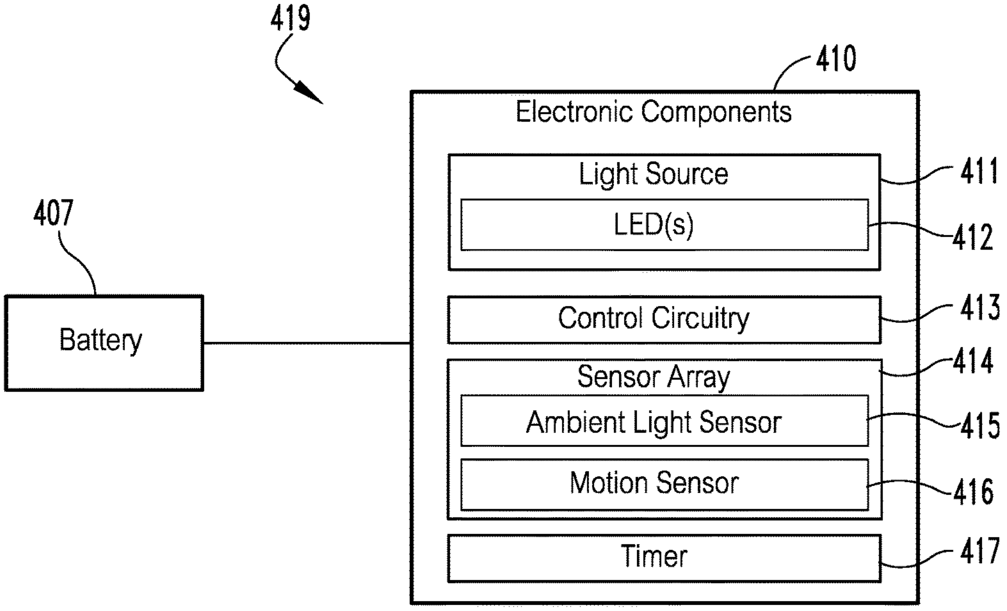
FIG. 9 is a schematic block diagram of the door knob illustrated in FIG. 8.

With additional reference to FIGS. 8 and 9, illustrated therein is a knob 400 according to certain embodiments. The knob 400 may, for example, be utilized as the handle 112 of the above-described door hardware apparatus 100. The knob 400 is another embodiment of the knobs described in U.S. patent application Ser. No. 16/552,573, filed Aug. 27, 2019, the contents of which are incorporated by reference in their entirety. Each of the knobs described herein provides at least one of a forward-facing light source or a radially outward-facing light source. In certain embodiments, these light sources may be used in combination with the rearward-facing light sources described in the above-referenced U.S. patent application Ser. No. 16/552,573.

The knob 400 generally includes a hollow shell 401 having a front face 402, an outer perimeter 403 extending distally from the front face 402, and a shank 404 extending distally from the rear of the shell 401. The front face 402 may, for example, be defined by a translucent plate 405. A battery holder 406 is slidably received in a slot formed in the shell 401, and holds a battery 407 operable to power the electronic components 410 of the knob 400. The electronic components 410 include a light source 411, such as one or more light emitting diodes (LEDs) 412, and control circuitry 413 operable to control the light source 411 using power from the battery 407. The electronic components 410 may further include a sensor array 414, which may include an ambient light sensor 415 and/or a motion sensor 416. In certain embodiments, the electronic components 410 may be provide on a printed circuit board assembly (PCBA) 419.

The shell 401 includes one or more viewing regions 409 through which light generated by the light source 411 is visible. In certain embodiments, one or more viewing regions 409 may be formed in the front face 402. Additionally or in the alternative, one or more viewing regions 409 may be formed in the outer perimeter 403. In certain embodiments, one or more viewing regions 409 may be formed in the rear or distal side of the knob 400, for example as described in the above-referenced U.S. patent application Ser. No. 16/552,573. In certain embodiments, one or more viewing regions 409 may be defined by open apertures. In certain embodiments, one or more viewing regions 409 may be defined by translucent or transparent regions of material. In certain embodiments, the viewing regions 409 may be connected with the light source 411 via one or more light pipes, such as fiber optic light pipes.

Operation of the light source 411 may be controlled by the control circuitry 413. In the illustrated embodiment, the control circuitry 413 is configured to control operation of the light source 411 based at least in part upon information received from the sensor array 414. The control of the light source 411 may be further based upon a comparison of the information to at least one criterion. In certain embodiments, the sensor array 414 may include an ambient light sensor 415, and the at least one criterion may include a criterion related to the level of ambient light sensed by the ambient light sensor 415. In certain embodiments, the sensor array 414 may include a motion sensor 416, and the at least one criterion may include a criterion related to motion sensed by the motion sensor 416. Further details regarding the control of the light source 411 can be found in the above-referenced U.S. patent application Ser. No. 16/552,573.

In certain embodiments, the knob 400 may provide user feedback relating to the location of the knob 400. For example, the knob 400 may illuminate when the ambient light sensor 415 indicates that it is dark in the vicinity of the knob 400, thereby aiding the user in navigating through the dark room or hallway. In certain embodiments, the knob 400 may simply illuminate itself without providing significant illumination to the vicinity. In other embodiments, the knob 400 may be structured to illuminate the vicinity to further aid the user in his or her navigation through the dark territory.

Figure 10:
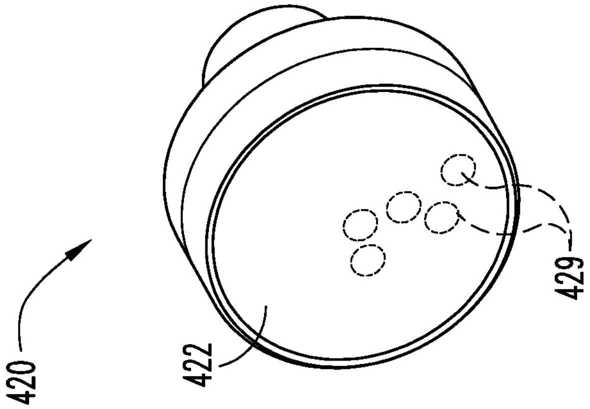
FIGS. 10-12 illustrate door knobs according to certain embodiments.
Figure 11:
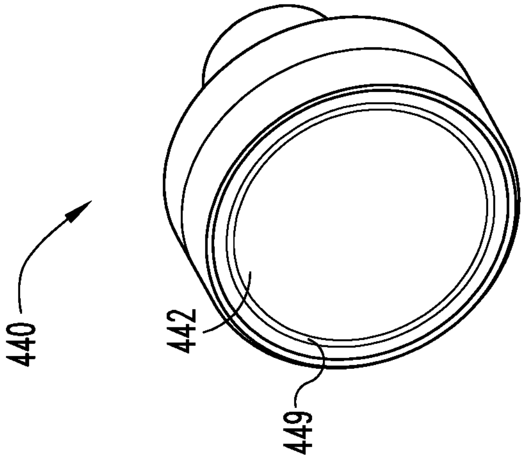
Figure 12:
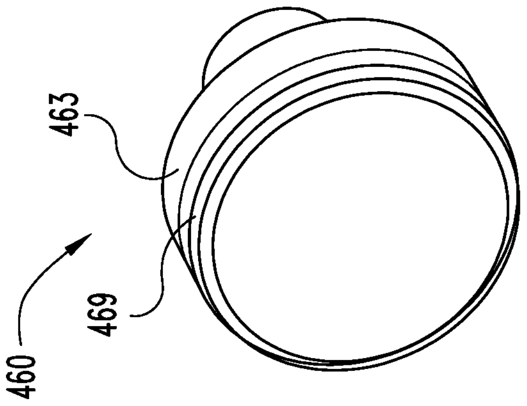

With additional reference to FIGS. 10-12, illustrated therein are knobs 420, 440, 460 according to certain embodiments, each of which is an implementation of the above-described knob 400. Accordingly, similar reference characters are used to indicate similar features. In the interest of conciseness, the following descriptions of the knobs 420, 440, 460 focus primarily on elements and features that were not specifically described with reference to the knob 400.

In the knob 420 illustrated in FIG. 10, a plurality of viewing regions 429 are formed in the front face 422 of the knob 420 such that the light generated by the light source forms a decorative pattern on the front face 422. In the knob 440 illustrated in FIG. 11, an annular viewing region 449 is formed in the front face 442 of the knob 440 such that the light generated by the light source forms a ring-shaped pattern on the front face 442. In the knob 460 illustrated in FIG. 12, an annular viewing region 469 is formed in the outer perimeter 463 of the knob 460. While certain example patterns have been illustrated for the viewing region, it is to be appreciated that additional and alternative patterns may be utilized.

Figure 13:
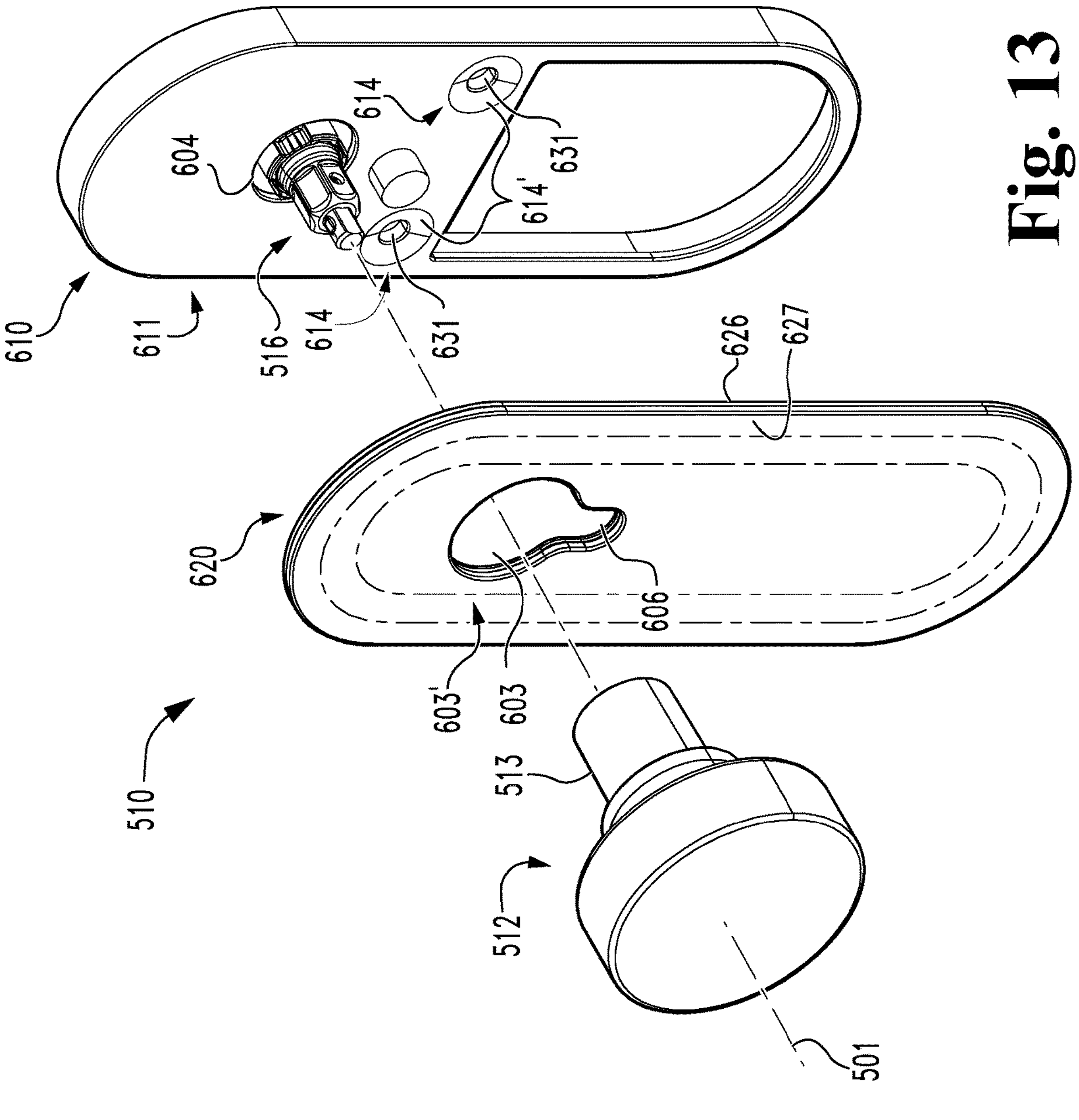
FIGS. 13 and 14 are exploded assembly views of a trim assembly according to certain embodiments.
Figure 14:
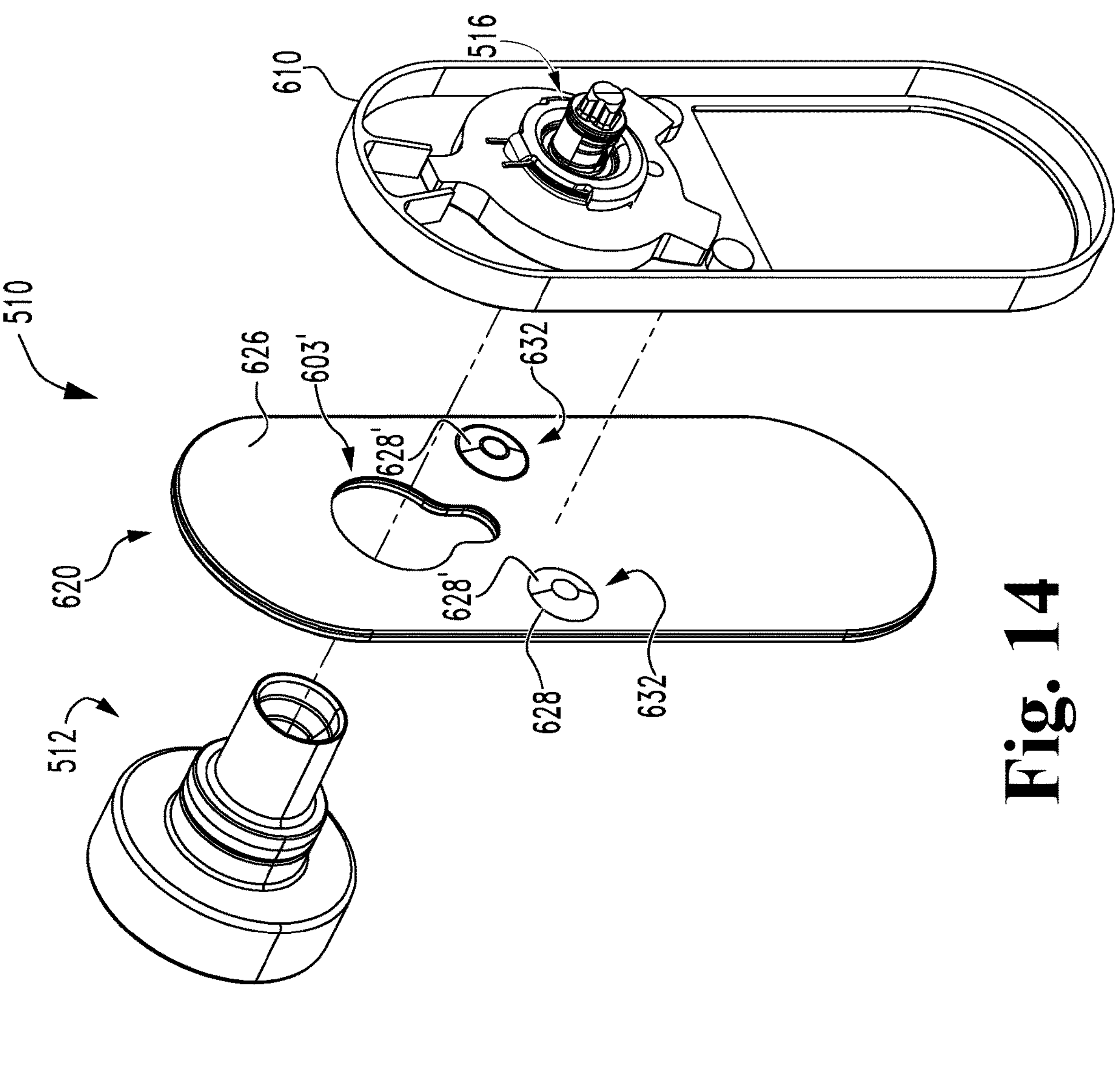

With additional reference to FIGS. 13 and 14, illustrated therein is trim assembly 510 according to certain embodiments, which includes a rose assembly 600 according to certain embodiments. The rose assembly 600 is somewhat similar to the above-described rose assembly 200, and similar reference characters are used to indicate similar elements and features. For example, the rose assembly 600 includes a mounting plate 610, a cover plate 620, and a releasable coupler 630, which respectively correspond to the mounting plate 210, cover plate 220, and releasable coupler 230 described above. In the interest of conciseness, the following description of the trim assembly 510 and the rose assembly 600 focuses primarily on elements and features that differ from those described above with reference to the trim assembly 110 and the rose assembly 200. It should be appreciated, however, that elements and features described with respect to the trim assembly 110 and/or the rose assembly 200 may be provided to the trim assembly 510 and/or the rose assembly 600, and that elements and features described with respect to the trim assembly 510 and/or the rose assembly 600 may be provided to the trim assembly 110 and/or the rose assembly 200.

The trim assembly 510 may, for example, be utilized as one or both of the trim assemblies 110, 130 in the door hardware apparatus 100. In addition to the rose assembly 600, the trim assembly 510 includes a spindle 516 and a handle 512 releasably secured to the spindle 516. The spindle 516 extends through an aperture 604 in the mounting plate 610, and in the illustrated form is rotatably mounted to the mounting plate 610. While the illustrated handle 512 is provided in the form of a knob, it is also contemplated that the handle 512 may be provided in the form of a lever.

In the embodiment illustrated in FIGS. 10 and 11, the spindle 516 and the lock actuator 542 extend through a single aperture 603' formed in the cover plate 620. The single aperture 603' is provided in the form of a keyhole shaped aperture, and includes a spindle-receiving region 603 and an actuator receiving region 606 that depends downward from the spindle-receiving region 603. It is also contemplated that the spindle-receiving region 603 and the actuator-receiving region 606 may be formed as distinct apertures, such as described above with reference to the apertures 203, 206 of the cover plate 220.

In the illustrated form, the mounting plate 610 defines a mounting area 611 having an outer perimeter that generally conforms to the outer perimeter of the cover plate 620. However, the illustrated mounting plate 610 does not include a lip such as the lip 218. As such, the mounting plate 610 may not necessarily be considered to define the mounting area 611 as a receiving space. The mounting plate 610 further defines at least one recessed portion 614 that facilitates the mounting and/or removal of the cover plate 620 to the mounting area 611, and in the illustrated form defines a pair of laterally-offset recessed portions 614. As described herein, the recessed portions 614 cooperate with protrusions 628 of the cover plate 620 to aid in aligning the cover plate 620 for installation to the mounting area 611. Thus, the recessed portions 614 may be considered to define alignment features of the mounting plate 610 and/or of the rose assembly 600.

The cover plate 620 includes at least one protrusion 628 configured to be received in the at least one recessed portion 614 of the mounting plate 610, and in the illustrated form includes a pair of protrusions 628 corresponding to the pair of recessed portions 614. In the illustrated form, each recessed portion 614 has a female frustoconical geometry, and each protrusion 628 has a male frustoconical geometry configured to mate with the female frustoconical geometry of the recessed portion(s) 614. It is also contemplated that the recessed portion(s) 614 and/or the protrusion(s) 628 may take another form. For example, a recessed portion 614 may be provided with a curved concave geometry, and the corresponding protrusion 628 may be provided with a correspondingly curved convex geometry.

Figure 16:
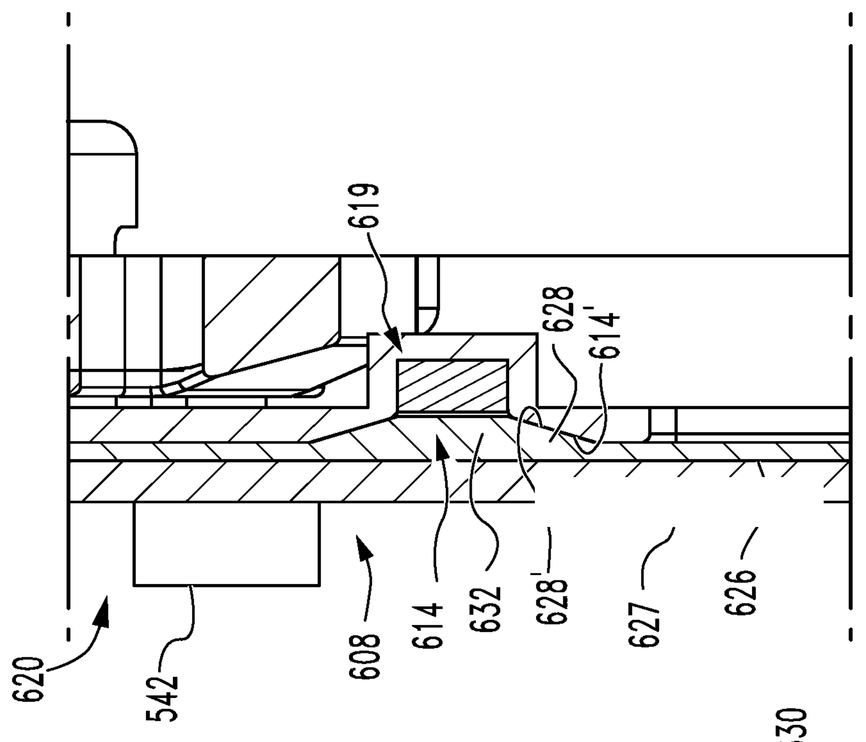
FIG. 16 is a cross-sectional view of a portion of the trim assembly illustrated in FIGS. 13 and 14.
Figure 15:
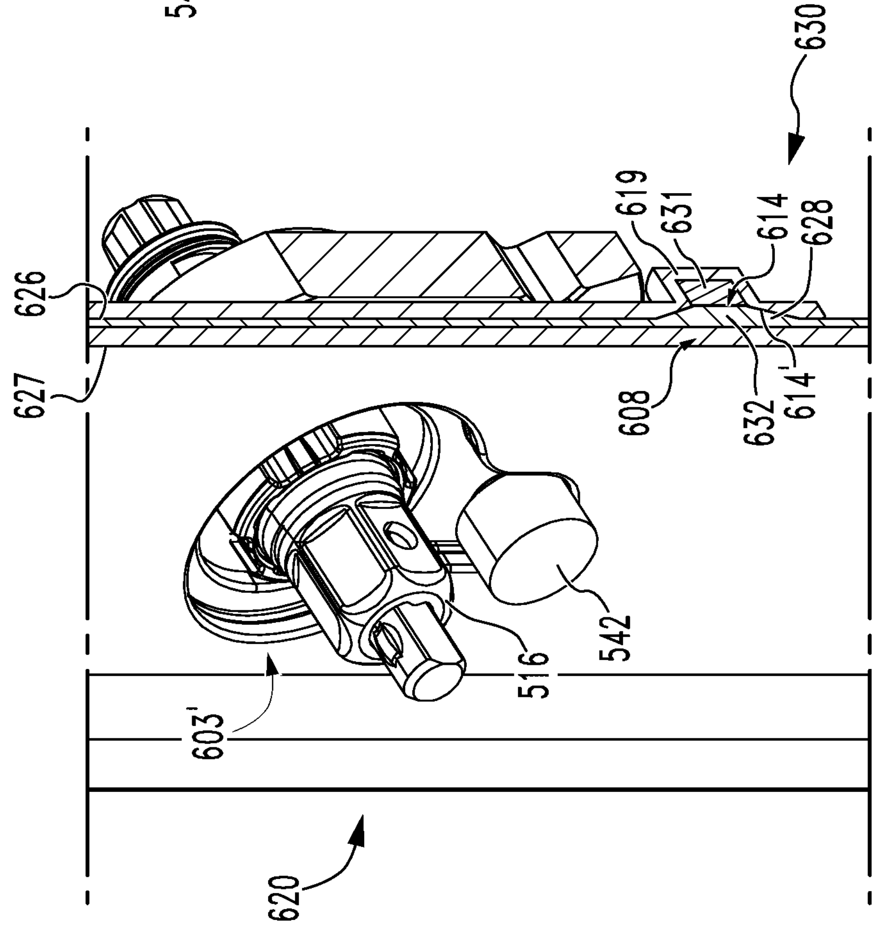
FIG. 15 is a cutaway perspective view of the trim assembly illustrated in FIGS. 13 and 14.

With additional reference to FIGS. 15 and 16, the recessed portion(s) 614 and the protrusion(s) 628 taken together may be considered to define an alignment mechanism 608 of the rose assembly 600. In the illustrated embodiment, each of the recessed portions 614 is provided in the mounting plate 610, and each of the protrusions 628 is provided on the cover plate 620. It is also contemplated that at least one recess 614 may be formed in the cover plate 620, and a corresponding at least one protrusion 628 may be formed on the mounting plate 610.

In the illustrated embodiment, each recessed portion 614 defines a pocket 619 in which a magnet defining the mounting plate coupler 631 is seated. The magnet may, for example, be secured in the pocket 619 using adhesives. It is also contemplated that the recessed portions 614 may not necessarily define pockets 619, and that the magnets 631 may instead be mounted behind the recessed portions 614. In the illustrated form, the cover plate coupler 632 is defined by the ferrous material of which the protrusions 628 are formed. In certain embodiments, such as those in which the support substrate 626 is formed of a ferrous material, the protrusions 628 may be integrally formed with the support substrate 626. Alternatively, the protrusions 628 may be mounted to the support substrate 626, and/or may include magnets that define the cover plate coupler(s) 632. Moreover, it is also contemplated that the cover plate coupler 632 may include a magnet, and that the mounting plate coupler 631 may include a ferrous material and/or a magnet.

During installation of the cover plate 620 to the mounting plate 610, the alignment mechanism 608 facilitates the positioning of the cover plate 620 in the appropriate location and orientation relative to the mounting area 611. More particularly, the recessed portions 614 and protrusions 628 are positioned such that when the protrusions 628 are received in the recessed portions 614, the spindle-receiving region 603 of the aperture 603' is aligned with the aperture 604 of the mounting plate 610 such that the spindle 516 can extend through the aligned apertures 603', 604. Similarly, the actuator-receiving region 606 is aligned with a corresponding aperture formed in the mounting plate 610 such that the lock actuator 542 is operable to extend through the aligned apertures.

In the illustrated form, each recessed portion 614 comprises a ramped surface 614', and each protrusion 628 comprises a corresponding ramped surface 628'. The ramped surfaces 614', 628' that partially define the recessed portions 614 and the protrusions 628 may serve to guide the cover plate 620 into its aligned position. For example, should the position of the cover plate 620 be slightly off true, the protrusions 628 may partially enter the recessed portions 614, and the ramped surfaces 614', 628' may aid the installer in more fully aligning the protrusions 628 for full insertion into the recessed portions 614. In embodiments in which the releasable coupler 630 is provided in the form of a magnetic coupler, the magnetic forces generated between the coupling portions 631, 632 may draw the protrusions 628 deeper into the recessed portions 614 as the releasable coupler 630 engages.

Upon installation of the cover plate 620 to the mounting plate 610, the alignment mechanism 608 also aids in retaining the cover plate 620 in the proper location and orientation relative to the mounting area 611. More particularly, when the cover plate 620 is mounted to the mounting area 611, the protrusions 628 engage the recessed portions 614 to discourage movement of the cover plate 620 in directions transverse to the primary axis 501. When the handle 512 is installed, the shank 513 of the handle 512 may face the cover plate 620 and limit movement of the cover plate 620 in a proximal direction along the primary axis 501. Should a user urge the cover plate 620 in a direction transverse to the primary axis 501, the engaged tapered surfaces of the recessed portions 614 and the protrusions 628 will urge the cover plate 620 proximally away from the mounting plate 610. This proximal urging may drive the front side of the cover plate 620 into engagement with the shank 513, thereby preventing the protrusions 628 from fully exiting the recessed portions 614. In such forms, the recessed portions 614 may aid in preventing rotation of the cover plate 620 about the spindle 516.

Figure 17:
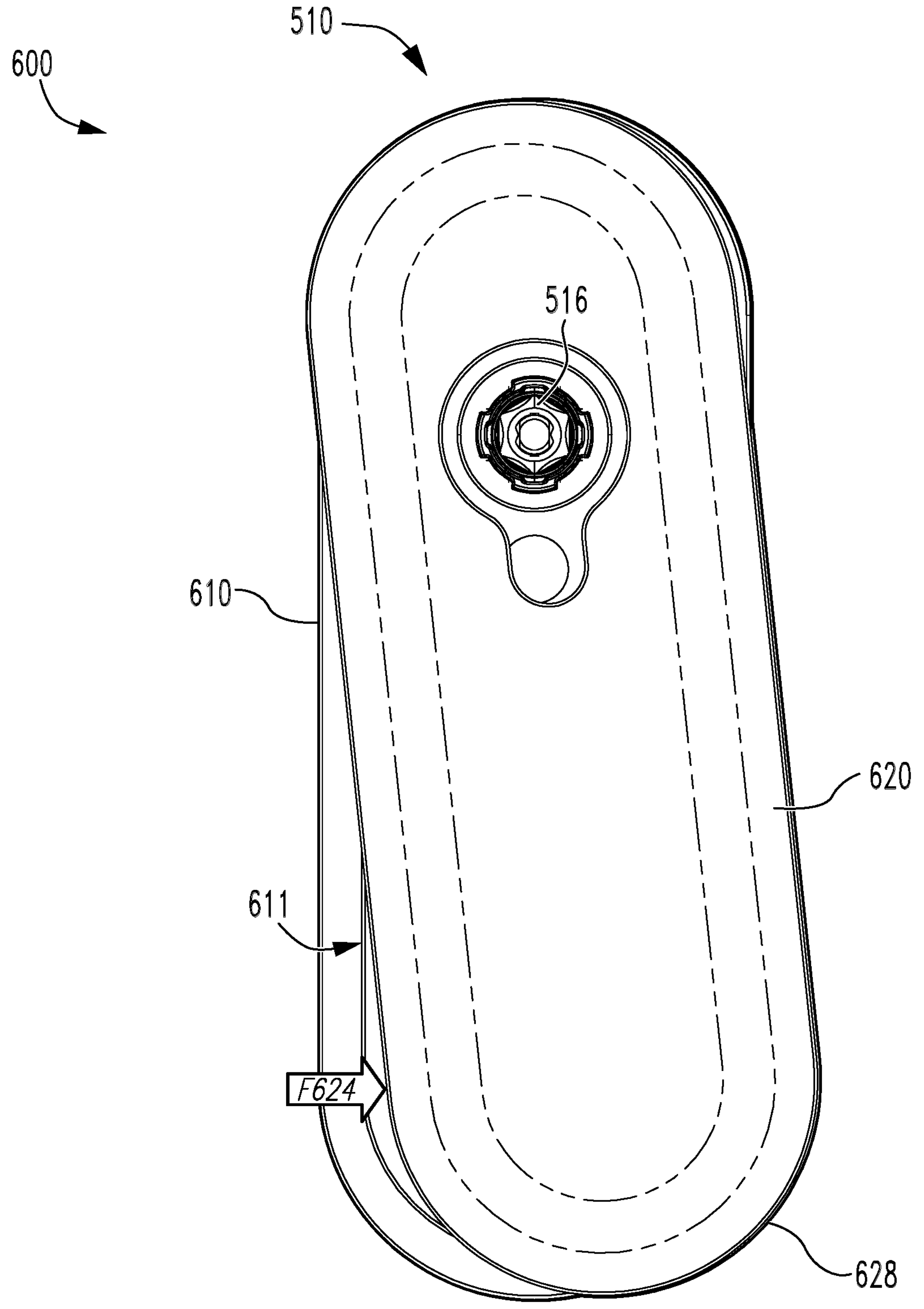
FIG. 17 is a plan view of the trim assembly illustrated in FIGS. 13 and 14 in a partially disassembled state.

With additional reference to FIG. 17, the engagement of the recessed portions 614 with the protrusions 628 may aid the removal of the cover plate 620 from the mounting plate 610. For example, should a user urge the cover plate 620 in a direction transverse to the primary axis 501 (e.g., by exerting a pushing force F624 on one edge of the cover plate 620), the engaged tapered surfaces of the recessed portions 614 and the protrusions 628 will urge the cover plate 620 proximally away from the mounting plate 610 as described above. This proximal movement moves the ferrous material of the cover plate coupler 632 away from the magnet of the mounting plate coupler 631, thereby reducing the magnetic attraction between the two and facilitating removal of the cover plate 620 from the mounting plate 610.

In certain embodiments, the rose assembly 600 may be provided with a corresponding product line in a manner analogous to that described above with the product line 200' corresponding to the rose assembly 200. While an example implementation of the above-described process 300 was described with reference to the rose assembly 200 and corresponding product line 200', it should be appreciated that the selection, installation, and/or removal of the cover plate 620 may proceed along the lines set forth above with reference to the process 300. For example, the selection procedure 310 may be performed to select the cover plate 620 from a plurality of cover plate configurations, the installation procedure 320 may be performed to install the selected cover plate 620 to the mounting plate 610, and the removal procedure 330 may be performed to remove the cover plate 620 from the mounting plate. In the interest of conciseness, the following description of an additional implementation of the process 300 focuses primarily on those blocks of the process 300 that differ from the above-described implementation of the process 300 (i.e., the implementation using the rose assembly 200 and the product line 200').

In block 324, the engaging of the releasable coupler 630 may involve utilizing the above-described alignment mechanism 608 defined by the recessed portions 614 and the protrusions 628 to align the cover plate 620 in the proper orientation relative to the mounting area 611. In embodiments in which the releasable coupler 630 is provided in the form of a magnetic coupler, the magnetic forces generated between the coupling portions 631, 632 may draw the protrusions 628 deeper into the recessed portions 614 to further aid in the alignment and coupling of the cover plate 620 with the mounting plate 610.

In block 332, the partial removal of the cover plate 620 may involve exerting a torque or force (e.g., a force F624) to urge the cover plate 620 to pivot about the spindle 316. As noted above, such urging causes the ramped surfaces 614' of the recessed portions 614 and the ramped surfaces 628' of the protrusions 628 to urge the cover plate 620 proximally away from the mounting plate 610. The cover plate 620 may thereby pivot to an orientation in which the top edge and/or the bottom edge is positioned outside the footprint of the mounting area 611. As a result, the exposed edge(s) 629 may be grasped and pulled to fully remove the cover plate 620 from the mounting plate 610 in the removal of block 336.

Certain embodiments of the present application relate to a method of customizing a door hardware apparatus mounted to a door, the method comprising: releasably mounting a first cover plate to a mounting plate of the door hardware apparatus; wherein the first cover plate comprises: a first cover plate coupler; a first cover plate first surface; and a first cover plate second surface opposite the first cover plate first surface; wherein the mounting plate comprises: a mounting area defined at least in part by a mounting plate first surface; and a mounting plate coupler; and wherein releasably mounting the first cover plate to the mounting plate comprises: positioning the cover plate relative to the mounting area such that the first cover plate second surface faces the mounting plate first surface; and with the first cover plate first surface facing the mounting plate first surface, engaging the first cover plate coupler with the mounting plate coupler, thereby releasably securing the first cover plate to the mounting area of the mounting plate.

In certain embodiments, the first cover plate further comprises a first aperture sized and shaped to receive a spindle of the door hardware apparatus; and wherein releasably mounting the first cover plate to the mounting plate further comprises positioning a portion of the spindle within the first aperture such that the spindle extends through the first aperture.

In certain embodiments, the method further comprises removing the first cover plate from the mounting plate, wherein removing the first cover plate comprises disengaging the first cover plate coupler from the mounting plate coupler.

In certain embodiments, the mounting plate comprises a recessed portion positioned behind the first cover plate when the first cover plate is mounted to the mounting plate, and wherein removing the first cover plate from the mounting plate comprises exerting a force on the first cover plate to cause a portion of the first cover plate to enter the recessed portion, thereby pivoting the first cover plate coupler away from the mounting plate coupler.

In certain embodiments, the method further comprises: after removing the first cover plate, remounting the first cover plate to the mounting plate, wherein remounting the first cover plate to the mounting plate comprises: reversing an orientation of the first cover plate such that the first cover plate second surface faces the mounting plate first surface; and with the first cover plate second surface facing the mounting plate first surface, releasably securing the first cover plate to the mounting area.

In certain embodiments, the method further comprises: after removing the first cover plate, releasably mounting a second cover plate to the mounting plate; wherein the second cover plate comprises a second cover plate coupler; and wherein releasably mounting the second cover plate to the mounting plate comprises engaging the second cover plate coupler with the mounting plate coupler to releasably secure the second cover plate to the mounting area.

In certain embodiments, the first cover plate further comprises a cover plate aperture; wherein the mounting plate further comprises an alignment feature and a mounting plate aperture; and wherein releasably mounting the first cover plate to the mounting plate further comprises engaging a particular portion of the first cover plate with the alignment feature to thereby align the cover plate aperture with the mounting plate aperture.

In certain embodiments, the alignment feature comprises one of a recess or a protrusion; and wherein the particular portion of the first cover plate comprises the other of the recess or the protrusion.

In certain embodiments, at least one of the recess or the protrusion comprises a ramped surface; wherein the method further comprises removing the first cover plate from the mounting plate; and wherein removing the first cover plate from the mounting plate comprises exerting a lateral force on the first cover plate, thereby causing the ramped surface to urge the first cover plate in a proximal direction away from the mounting plate.

In certain embodiments, the mounting plate coupler comprises a magnet; wherein the protrusion comprises the first cover plate coupler; and wherein engaging the first cover plate coupler with the mounting plate coupler comprises generating an attractive magnetic force between the magnet and the first cover plate coupler.

Certain embodiments of the present application relate to a door knob, comprising: a hollow shell having a shank extending from a distal end thereof; a light source disposed within the hollow shell; a sensor operable to sense a sensed condition; and control circuitry connected with light source and the sensor, wherein the control circuitry is configured to activate the light source based at least in part upon information received from the sensor; wherein the hollow shell includes a viewing region through which light generated by the light source passes when the light source is activated by the control circuitry.

In certain embodiments, the sensor comprises one of a motion sensor or an ambient light sensor.

In certain embodiments, the door knob further comprises: a battery holder slidably received in a slot of the hollow shell; and a battery held by the battery holder and supplying the control circuitry with electrical power.

In certain embodiments, the viewing region is formed in a front face of the hollow shell.

In certain embodiments, the viewing region is formed in an outer perimeter of the hollow shell.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus, comprising:
a spindle;
a handle removably mounted to the spindle;
a rose assembly configured for mounting to a door, the rose assembly comprising:
a cover plate including a first opening, a first region, and a second region; and
a mounting plate configured for mounting to the door, the mounting plate comprising:
a mounting area to which the cover plate is mounted;
a countersunk fastener aperture;
a second opening aligned with the first opening; and
a recessed portion configured to facilitate removal of the cover plate from the mounting area, wherein the recessed portion is defined behind the cover plate; and
a releasable coupler retaining the cover plate at the mounting area when the releasable coupler is in an engaged condition; and
a threaded fastener received in the countersunk fastener aperture and operable to secure the mounting plate to the door, wherein the threaded fastener is covered by the cover plate when the cover plate is mounted to the mounting area in an installed orientation in which the releasable coupler is in the engaged condition, and wherein the threaded fastener is accessible upon removal of the cover plate from the mounting area;
wherein the spindle extends through the first opening and the second opening;
wherein, with the cover plate in the installed orientation and the handle removed from the spindle, a pressing force exerted on the second region disengages the releasable coupler and pivots the cover plate to a pivoted orientation in which the first region is positioned outside of the mounting area and the second region is received within the recessed portion; and
wherein, with the cover plate in the installed orientation and the handle mounted to the spindle, a shank of the handle is operable to abut the cover plate to thereby prevent disengagement of the releasable coupler while retaining the cover plate in the installed orientation and preventing access to the threaded fastener.

2. The apparatus of claim 1, wherein the releasable coupler has:
a coupling state in which the releasable coupler couples the cover plate to the mounting plate; and
a decoupling state in which the releasable coupler releases the cover plate from the mounting plate; and
wherein the releasable coupler is configured to transition between the coupling state and the decoupling state without the use of tools.

3. The apparatus of claim 1, wherein the releasable coupler comprises at least one magnet.

4. The apparatus of claim 1, wherein the mounting plate further comprises a raised lip circumferentially surrounding the mounting area, thereby defining a receiving space in which the cover plate is received.

5. The apparatus of claim 1, wherein the mounting area comprises a first planar portion that abuts a rear side of the cover plate;
wherein the recessed portion comprises a second planar portion that extends at an oblique angle relative to the first planar portion; and
wherein the rear side of the cover plate is flush with the second planar portion when the cover plate is in the pivoted orientation.

6. The apparatus of claim 1, wherein a first perimeter geometry of the cover plate matches a second perimeter geometry of the mounting area of the mounting plate.

7. The apparatus of claim 6, wherein the mounting plate further comprises a raised lip defining a receiving space in which the cover plate is received.

8. A system including the apparatus of claim 1, the system further comprising a second cover plate sized and shaped to be mounted to the mounting area upon removal of the cover plate from the mounting area;
wherein the releasable coupler comprises a first coupling portion on the cover plate and a second coupling portion on the mounting plate;
wherein the first coupling portion is configured to engage the second coupling portion to selectively retain the cover plate within the mounting area; and
wherein the second cover plate comprises a third coupling portion configured to engage the second coupling portion of the mounting plate to selectively retain the second cover plate within the mounting area of the mounting plate.

9. The apparatus of claim 1, wherein, with the handle removed from the spindle, the cover plate is operable to be manually removed from the mounting area without use of a tool.

10. An apparatus, comprising:
a rose assembly configured for mounting to a door, the rose assembly comprising:
a mounting plate configured for mounting to the door, the mounting plate comprising a mounting area and a recessed portion;
a cover plate removably mounted to the mounting area, the cover plate comprising an opening, a first region, and a second region aligned with the recessed portion; and
a releasable coupler selectively retaining the cover plate within the mounting area of the mounting plate;
wherein the first region is releasably coupled to the mounting plate via the releasable coupler; and
wherein the cover plate is configured to pivot the first region away from the mounting plate in response to a pushing force urging the second region into the recessed portion; a spindle extending through the opening;
a handle removably coupled to the spindle, wherein the handle is configured to prevent removal of the cover plate from the mounting area when the handle is removably coupled to the spindle; and
a threaded fastener operable to secure the mounting plate to the door, wherein a head of the threaded fastener is countersunk into the mounting plate, is covered by the cover plate when the cover plate is mounted to the mounting area, and is exposed upon removal of the cover plate from the mounting area; and
wherein, with the handle removed from the spindle, the cover plate is operable to be manually removed from the mounting area without use of a tool.

11. The apparatus of claim 10, wherein the mounting plate further comprises a raised lip circumferentially surrounding the mounting area, thereby defining a receiving space in which the cover plate is seated.

12. The apparatus of claim 10, wherein the releasable coupler comprises at least one magnet.

13. The apparatus of claim 10, wherein the cover plate comprises a planar support substrate and a decorative layer mounted to the planar support substrate.

14. A system including the apparatus of claim 10, the system further comprising a second cover plate sized and shaped to be mounted to the mounting area of the mounting plate upon removal of the cover plate from the mounting area.

15. The system of claim 14, wherein the releasable coupler comprises a first coupling portion on the cover plate and a second coupling portion on the mounting plate;

wherein the first coupling portion is configured to engage the second coupling portion to selectively retain the cover plate within the mounting area; and wherein the second cover plate comprises a third coupling portion configured to engage the second coupling portion on the mounting plate to selectively retain the second cover plate within the mounting area of the mounting plate.

16. The apparatus of claim 10, wherein the handle comprises a shank inoperable to pass through the opening; and wherein an end portion of the shank is operable to abut the cover plate to thereby prevent decoupling of the releasable coupler.

17. A door hardware apparatus configured for mounting to a door having a door face, the door hardware apparatus comprising:

a rose assembly comprising:

a mounting plate configured for mounting to the door face, the mounting plate comprising a first planar surface that extends parallel to the door face when the mounting plate is mounted to the door face, the mounting plate further comprising a mounting area and a recessed portion that is defined at least in part by a second planar surface that extends at an oblique angle relative to the first planar surface;

a cover plate removably mounted to the mounting area, the cover plate comprising an opening, a first region, and a second region aligned with the recessed portion; and a releasable coupler selectively retaining the cover plate at the mounting area in an installed orientation in which a rear side of the cover plate extends parallel to the first planar surface;

a spindle extending through the opening; and a handle removably coupled to the spindle;

wherein, with the cover plate in the installed orientation and the handle decoupled from the spindle, a pressing force exerted on the second region disengages the releasable coupler and pivots the cover plate to a pivoted orientation in which the second region is received within the recessed portion and the rear side of the cover plate abuts the second planar surface to thereby cause the cover plate to define the oblique angle relative to the first planar surface; and wherein, with the cover plate in the installed orientation and the handle coupled to the spindle, a shank of the handle is operable to abut the cover plate to thereby prevent disengagement of the releasable coupler while retaining the cover plate in the installed orientation.

18. The door hardware apparatus of claim 17, further comprising a threaded fastener operable to secure the mounting plate to the door, wherein a head of the threaded fastener is countersunk into the mounting plate, is covered by the cover plate when the cover plate is mounted to the mounting area, and is exposed upon removal of the cover plate from the mounting area.

19. The door hardware apparatus of claim 17, wherein with the handle removed from the spindle, the cover plate is operable to be manually removed from the mounting area without use of a tool.

* * * * *